(12) United States Patent
Tomoda et al.

(10) Patent No.: US 11,222,295 B2
(45) Date of Patent: Jan. 11, 2022

(54) ACTIVITY RECORDING DEVICE, ACTIVITY RECORDING PROGRAM, AND ACTIVITY RECORDING METHOD

(71) Applicant: Mitsubishi Electric Corporation, Tokyo (JP)

(72) Inventors: Tsubasa Tomoda, Tokyo (JP); Tetsuya Tamaki, Tokyo (JP); Tomohito Nakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 55 days.

(21) Appl. No.: 16/625,848

(22) PCT Filed: Jul. 12, 2018

(86) PCT No.: PCT/JP2018/026274
§ 371 (c)(1),
(2) Date: Dec. 23, 2019

(87) PCT Pub. No.: WO2019/039126
PCT Pub. Date: Feb. 28, 2019

(65) Prior Publication Data
US 2020/0175442 A1    Jun. 4, 2020

(30) Foreign Application Priority Data

Aug. 24, 2017 (JP) .............................. JP2017-160807

(51) Int. Cl.
*G06Q 10/06* (2012.01)
*H04W 4/029* (2018.01)
(Continued)

(52) U.S. Cl.
CPC ..... *G06Q 10/0639* (2013.01); *G06Q 10/1091* (2013.01); *H04W 4/027* (2013.01); *H04W 4/029* (2018.02)

(58) Field of Classification Search
CPC .......... G06Q 10/0639; G06Q 10/1091; H04W 4/029; H04W 4/027
See application file for complete search history.

(56) References Cited

U.S. PATENT DOCUMENTS

2008/0189157 A1* 8/2008 Ara ...................... G06Q 10/00
705/7.15
2014/0067262 A1* 3/2014 Iketani ................ G01C 21/165
701/518

(Continued)

FOREIGN PATENT DOCUMENTS

JP    2008201569 A    9/2008
JP    2009150711 A    7/2009
(Continued)

OTHER PUBLICATIONS

Automated task level activity analysis through fusion of real time location sensors and worker's thoracic posture; Tao Cheng (Year: 2013).*

(Continued)

*Primary Examiner* — Timothy Padot
*Assistant Examiner* — Francis Z. Santiago Merced
(74) *Attorney, Agent, or Firm* — Buchanan Ingersoll & Rooney PC

(57) ABSTRACT

An activity recording device includes: a work specifying unit for specifying a work of a worker; a position specifying unit for specifying a position of the worker from a position coordinate of the worker; a state specifying unit for specifying a state of the work of the worker from the position specified by the position specifying unit; and a recording unit for recording, as activity data, the work, the position, and the state in association with an activity time, wherein the position specifying unit includes a position estimation unit and a position correction unit.

10 Claims, 36 Drawing Sheets

(51) Int. Cl.
   *G06Q 10/10*      (2012.01)
   *H04W 4/02*       (2018.01)

(56) References Cited

U.S. PATENT DOCUMENTS

| | | | |
|---|---|---|---|
| 2016/0025496 A1 | 1/2016 | Shimizu | |
| 2016/0253618 A1* | 9/2016 | Imazawa | G06K 9/6296 |
| | | | 705/7.15 |
| 2016/0260046 A1* | 9/2016 | Cai | G16H 70/20 |
| 2018/0020422 A1* | 1/2018 | Ichikawa | G01S 1/00 |
| 2018/0275243 A1* | 9/2018 | Uchida | G01S 5/021 |
| 2019/0050946 A1* | 2/2019 | Hicks | G06Q 10/063114 |

FOREIGN PATENT DOCUMENTS

| | | | |
|---|---|---|---|
| JP | 2011099753 A | 5/2011 |
| JP | 2012098137 A | 5/2012 |
| WO | 2014038041 A1 | 3/2014 |
| WO | 2014156385 A1 | 10/2014 |

OTHER PUBLICATIONS

Fujita Akihisa, "New edition the basics of IE", issued on Sep. 1, 1999, pp. 199-230.

Hirano Hiroyuki, "New work study—basic technology of modern manufacturing", Nikkan Kogyo Shimbun, Ltd., issued Jan. 15, 2004, pp. 73-77.

International Search Report (PCT/ISA/210) dated Oct. 2, 2018, by the Japan Patent Office as the International Searching Authority for International Application No. PCT/JP2018/026274.

\* cited by examiner

FIG. 5

| WORK | POSITION | STATE |
|---|---|---|
| LINE WORK A | ASSEMBLY LINE 1 | ASSEMBLY WORK |
| LINE WORK A | ASSEMBLY LINE 2 | HELP FOR LINE 2 |
| LINE WORK A | ASSEMBLY LINE 3 | HELP FOR LINE 3 |
| LINE WORK A | MEETING ROOM | MEETING |
| LINE WORK A | LEADER STATION | COUNSEL |
| LINE WORK A | APPARATUS SECTION STATION | APPARATUS TROUBLE COUNSEL |
| WATER SPIDER B | MATERIAL PLACE | MATERIAL CONVEYANCE |
| WATER SPIDER B | ASSEMBLY LINE 1 | SUPPLY TO ASSEMBLY LINE 1 |
| WATER SPIDER B | ASSEMBLY LINE 2 | SUPPLY TO ASSEMBLY LINE 2 |
| WATER SPIDER B | ASSEMBLY LINE 3 | SUPPLY TO ASSEMBLY LINE 3 |
| WATER SPIDER B | HALF-COMPLETION LINE | PICK UP HALF-COMPLETED PRODUCT |
| WATER SPIDER B | MEETING ROOM | MEETING |
| WATER SPIDER B | LEADER STATION | COUNSEL |
| | | |

FIG. 9

| TIME [s] | VERTICAL ACCELERATION [m/s$^2$] |
|---|---|
| 0.000 | 9.088 |
| 0.033 | 9.194 |
| 0.067 | 9.069 |
| 0.100 | 9.079 |
| 0.133 | 9.203 |
| 0.167 | 9.203 |
| 0.200 | 8.859 |
| 0.233 | 8.983 |
| 0.267 | 9.290 |
| 0.300 | 9.117 |
| 0.333 | 8.887 |
| 0.367 | 8.906 |
| 0.400 | 9.155 |
| 0.433 | 9.194 |
| 0.467 | 8.954 |
| 0.500 | 8.839 |
| 0.533 | 8.906 |
| 0.567 | 9.146 |
| 0.600 | 9.213 |
| 0.633 | 8.792 |

FIG. 15

| TIME [s] | AZIMUTH |
|---:|---:|
| 0.00 | −0.89 |
| 0.06 | −0.90 |
| 0.12 | −0.90 |
| 0.19 | −0.91 |
| 0.27 | −0.92 |
| 0.33 | −0.92 |
| 0.39 | −0.90 |
| 0.47 | −0.86 |
| 0.53 | −0.80 |
| 0.59 | −0.70 |
| 0.67 | −0.57 |
| 0.73 | −0.46 |
| 0.80 | −0.36 |
| 0.86 | −0.28 |
| 0.94 | −0.22 |
| 1.00 | −0.18 |

FIG. 18

| TIME [s] | RECEIVED BEACON ID | RSSI [dBm] |
|---|---|---|
| 0 | 1 | −68 |
| 0.019 | 2 | −92 |
| 0.061 | 2 | −92 |
| 0.084 | 2 | −92 |
| 0.124 | 1 | −74 |
| 0.151 | 1 | −74 |
| 0.186 | 1 | −74 |
| 0.219 | 1 | −78 |
| 0.267 | 2 | −90 |
| 0.286 | 1 | −78 |
| 0.332 | 1 | −68 |
| 0.360 | 2 | −91 |
| 0.393 | 1 | −68 |
| 0.429 | 1 | −69 |
| 0.474 | 2 | −88 |
| 0.487 | 2 | −88 |
| 0.531 | 1 | −69 |
| 0.564 | 2 | −86 |
| 0.592 | 1 | −69 |
| 0.630 | 1 | −69 |
| 0.666 | 1 | −69 |

FIG. 20

| TIME t | BEACON 1 | BEACON 2 | BEACON 3 |
|---|---|---|---|
| 1 | −80 | −70 | −85 |
| 2 | −75 | −80 | −80 |
| 3 | −50 | −70 | −90 |
| 4 | −80 | −90 | −70 |
| 5 | −90 | −85 | −80 |

FIG. 21

| TIME t | BEACON 1 | BEACON 2 | BEACON 3 |
|---|---|---|---|
| 1 | −80 | <u>−70</u> | −85 |
| 2 | <u>−75</u> | −80 | −80 |
| 3 | <u>−50</u> | −70 | −90 |
| 4 | −80 | −90 | <u>−70</u> |
| 5 | −90 | −85 | <u>−80</u> |
| THRESHOLD | −70 | −80 | −80 |

FIG. 22

| TIME t | BEACON 1 | BEACON 2 | BEACON 3 | APPROACHED BEACON ID |
|---|---|---|---|---|
| 1 | -80 | <u>-70</u> | -85 | 2 |
| 2 | <u>-75</u> | -80 | -80 | 0 |
| 3 | <u>-50</u> | -70 | -90 | 1 |
| 4 | -80 | -90 | <u>-70</u> | 3 |
| 5 | -90 | -85 | <u>-80</u> | 0 |
| THRESHOLD | -70 | -80 | -80 | |

FIG. 24

| BEACON ID | X | Y |
|---|---|---|
| 1 | 0 | 0 |
| 2 | -42.75 | -0.75 |
| 3 | -190.5 | 22.5 |
| 4 | -225.75 | 23.25 |
| 5 | -220.5 | -27 |
| 6 | -249.75 | -134.104 |
| 7 | -274.5 | -203.104 |
| 8 | -188.25 | -208.354 |
| 9 | -152.25 | -162.604 |
| 10 | -6 | -152.177 |

FIG. 27

| POSITION PATTERN |
|---|
| ASSEMBLY LINE 1 |
| ASSEMBLY LINE 2 |
| ASSEMBLY LINE 3 |
| ASSEMBLY LINE 4 |

FIG. 28

| WORK | POSITION | STATE | TIME |
|---|---|---|---|
| WATER SPIDER B | ASSEMBLY LINE 1 | SUPPLY TO ASSEMBLY LINE 1 | 2017/6/20 19:46 |
| WATER SPIDER B | ASSEMBLY LINE 2 | SUPPLY TO ASSEMBLY LINE 2 | 2017/6/20 19:54 |
| WATER SPIDER B | ASSEMBLY LINE 3 | SUPPLY TO ASSEMBLY LINE 3 | 2017/6/20 19:57 |
| WATER SPIDER B | ASSEMBLY LINE 4 | SUPPLY TO ASSEMBLY LINE 4 | 2017/6/20 19:58 |
| WATER SPIDER B | ASSEMBLY LINE 1 | SUPPLY TO ASSEMBLY LINE 1 | 2017/6/20 20:00 |
| WATER SPIDER B | ASSEMBLY LINE 2 | SUPPLY TO ASSEMBLY LINE 2 | 2017/6/20 20:08 |
| WATER SPIDER B | ASSEMBLY LINE 3 | SUPPLY TO ASSEMBLY LINE 3 | 2017/6/20 20:11 |
| WATER SPIDER B | ASSEMBLY LINE 4 | SUPPLY TO ASSEMBLY LINE 4 | 2017/6/20 20:12 |
| WATER SPIDER B | ASSEMBLY LINE 1 | SUPPLY TO ASSEMBLY LINE 1 | 2017/6/20 20:14 |
| WATER SPIDER B | ASSEMBLY LINE 2 | SUPPLY TO ASSEMBLY LINE 2 | 2017/6/20 20:22 |
| WATER SPIDER B | ASSEMBLY LINE 4 | SUPPLY TO ASSEMBLY LINE 4 | 2017/6/20 20:25 |

FIG. 31

| TIME | | FORKLIFT A | FORKLIFT B | FORKLIFT C |
|---|---|---|---|---|
| 2017/6/20 | 20:25 | ASSEMBLY LINE 1 | MATERIAL PLACE | PRODUCT WAREHOUSE |
| 2017/6/20 | 20:30 | ASSEMBLY LINE 2 | HALF-COMPLETION LINE | ASSEMBLY LINE 1 |
| 2017/6/20 | 20:35 | ASSEMBLY LINE 1 | MATERIAL PLACE | ASSEMBLY LINE 2 |
| 2017/6/20 | 20:40 | ASSEMBLY LINE 2 | ASSEMBLY LINE 1 | ASSEMBLY LINE 1 |
| 2017/6/20 | 20:45 | ASSEMBLY LINE 3 | ASSEMBLY LINE 3 | ASSEMBLY LINE 2 |
| 2017/6/20 | 20:50 | ASSEMBLY LINE 3 | ASSEMBLY LINE 3 | ASSEMBLY LINE 1 |
| 2017/6/20 | 20:55 | ASSEMBLY LINE 3 | PRODUCT WAREHOUSE | ASSEMBLY LINE 2 |
| 2017/6/20 | 21:00 | PRODUCT WAREHOUSE | ASSEMBLY LINE 3 | MATERIAL PLACE |
| 2017/6/20 | 21:05 | ASSEMBLY LINE 3 | ASSEMBLY LINE 3 | PRODUCT WAREHOUSE |

ACTIVITY RECORDING DEVICE, ACTIVITY RECORDING PROGRAM, AND ACTIVITY RECORDING METHOD

TECHNICAL FIELD

The present disclosure relates to an activity recording device, an activity recording program, and an activity recording method for recording activity of a worker.

BACKGROUND ART

In a production site or the like, production equipment (apparatus) and a worker (person) exist, and they mutually play respective roles to perform production activity (hereinafter, referred to as activity). In some cases, processing of materials, assembly of products, or the like is performed by a worker, and in other cases, such an operation is automatically performed using an apparatus. Even in the case where an apparatus automatically performs activity, a worker supplies materials, conveys products, or confirms whether the operation state of the apparatus is normal, and thus the worker plays an important role in a production site. Therefore, grasping the efficiency of worker's production activity (hereinafter, referred to as worker activity) is important in evaluating productivity in the entire production site.

Conventionally, in recording and analysis of worker activity, by a so-called industrial engineering (IE) method in which a third person observes a worker at a production site, actions of a worker are recorded and used for analysis. For example, in a "video action analysis" method, an observer continuously photographs and records worker activity by using a video device, to analyze in what order the works are performed, and each of actions thereof (see, for example, Non-Patent Document 1), and in a "work sampling" method, the operation states, the work types, and the like of a person and a machine are instantaneously observed and a time profile and the like of each observation item are analyzed (see, for example, Non-Patent Document 2).

However, in such IE methods, great labor is required for observation by an observer, and thus there is a problem that it is difficult to record a large amount of worker activity in more detail and more accurately. Regarding this problem, positioning technology using radio waves of beacons provided in a positioning area in advance (see, for example, Patent Document 1), and technology for automatically acquiring actions of a worker by using a GPS or autonomous navigation (see, for example, Patent Document 2) have been developed.

CITATION LIST

Patent Document

Patent Document 1: Japanese Laid-Open Patent Publication No. 2011-99753
Patent Document 2: Japanese Laid-Open Patent Publication No. 2009-150711

Non-Patent Document

Non-Patent Document 1: Hirano Hiroyuki, "New work study—basic technology of modern manufacturing", NIKKAN KOGYO SHIMBUN, LTD., issued on Jan. 15, 2004 (pp. 73-77)

Non-Patent Document 2: FUJITA AKIHISA "New edition the basics of IE" KENPAKUSHA, issued on Sep. 1, 1999 (pp. 199-230)

SUMMARY OF THE INVENTION

Problems to be Solved by the Invention

In order to quickly perform improvement activity for a worker at a production site or the like, it is necessary to reduce cost required for data acquisition and analysis, and repeat analysis and improvement in multiple cycles. In the methods described in Patent Document 1 and Patent Document 2, position data for a worker can be automatically acquired, but there is a problem that the calculation load is great because, for example, it is necessary to individually prepare pre-established data which is a feature of analysis, for map data.

The present disclosure has been made to solve the above problem, and an object of the present disclosure is to provide an activity recording device, an activity recording program, and an activity recording method that enable the position of a worker to be specified accurately with a small calculation load.

Solution to the Problems

An activity recording device according to the present disclosure is an activity recording device including: a work specifying unit for specifying a work of a worker; a position specifying unit for specifying a position of the worker from a position coordinate of the worker; a state specifying unit for specifying a state of the work of the worker from the position specified by the position specifying unit; a recording unit for recording, as activity data, the work, the position, and the state in association with an activity time; and a communication module capable of transmission and reception. The position specifying unit includes a position estimation unit for estimating the position of the worker from a movement speed of the worker and a history of a direction of the worker, and a position correction unit which extracts a period in which a reception strength at which the activity recording device receives radio waves transmitted from a plurality of beacons used in a predetermined space in which the worker is present, is smaller than a predetermined strength, and corrects the position of the worker in the period in accordance with a difference in the position estimated by the position estimation unit and a difference between coordinate positions of the beacons before and after the period. The communication module transmits the recorded activity data to another activity recording device, and receives another activity data transmitted from the other activity recording device.

Effect of the Invention

The activity recording device, the activity recording program, and the activity recording method according to the present disclosure enable the position of a worker to be specified with a small calculation load, and also, enable accuracy of the specified worker position to be easily improved.

BRIEF DESCRIPTION OF THE DRAWINGS

FIG. 5 shows an example of relevance data according to embodiment 1.

FIG. 9 shows an example of values of a vertical acceleration signal, according to embodiment 1.

FIG. 15 shows an example of an azimuth, according to embodiment 1.

FIG. 18 shows an example of a beacon radio wave strength according to embodiment 1.

FIG. 20 shows an example of beacon IDs and normalized RSSIs at each time, according to embodiment 1.

FIG. 21 shows an example of a cross table to which a threshold value is added, according to embodiment 1.

FIG. 22 shows an example of a result when the beacon ID of the beacon that is most approached is determined, according to embodiment 1.

FIG. 24 shows an example of beacon coordinate information according to embodiment 1.

FIG. 27 shows an example of standard activity data according to embodiment 2.

FIG. 28 shows an example of recorded activity data according to embodiment 2.

FIG. 31 shows an example of merged activity data according to embodiment 3.

DESCRIPTION OF EMBODIMENTS

Embodiment 1

The present disclosure provides an activity recording device which is carried by a worker and enables the position of the worker to be specified accurately with a small calculation load while the worker is doing activity in a predetermined space where the worker exists, such as a production site.

Figure 1:
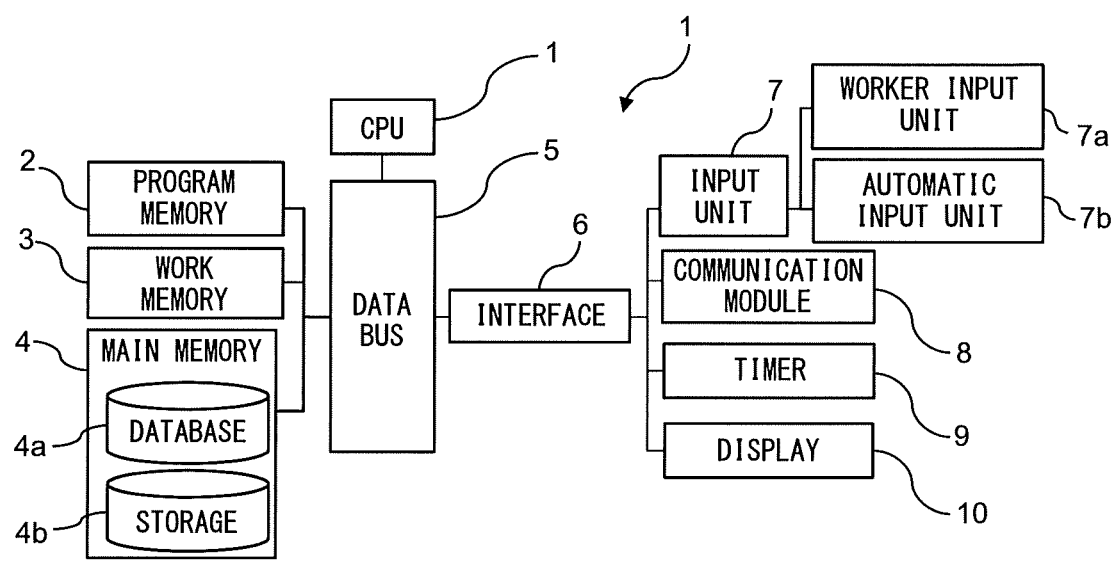
FIG. 1 is a diagram showing the hardware configuration of an activity recording device according to embodiment 1.

FIG. 1 is a diagram showing the hardware configuration of an activity recording device 11 according to embodiment 1. In FIG. 1, in the activity recording device 11 according to embodiment 1, a central processing unit (CPU) 1, a program memory 2 in which a work executed by the CPU 1 is stored, a work memory 3 to which data is temporarily transferred for the CPU 1 to perform a calculation process, a main memory 4 (including a database 4a of various data and a storage 4b for storing activity data), and an interface 6, are connected to a data bus 5.

The program memory 2 is a storage medium in which a program readable by the activity recording device 11 is stored. The program memory 2 stores an activity recording program for specifying and recording four elements (work, position, state, activity time) constituting data of a record of worker's activity. The activity recording device 11 operates on the basis of the activity recording program. Here, the "work" refers to a predetermined work of a worker, and the "position" refers to a location in a production site where the worker performs activity. In addition, the "state" refers to the state of a work of a specified worker in the production site, and the "activity time" refers to a time at which the worker performs activity.

In the activity recording device 11, an input unit 7 including a worker input unit 7a for receiving a worker's input and an automatic input unit 7b based on a sensor, a communication module 8 for performing communication with a communication device or the like outside the activity recording device 11, a timer 9 for managing time, and a display 10, are connected via an interface 6. The timer 9 is also used as a time imparting unit for imparting time. A display screen of the display 10 may also serve as a touch panel and a keyboard as the worker input unit 7a.

Figure 2:
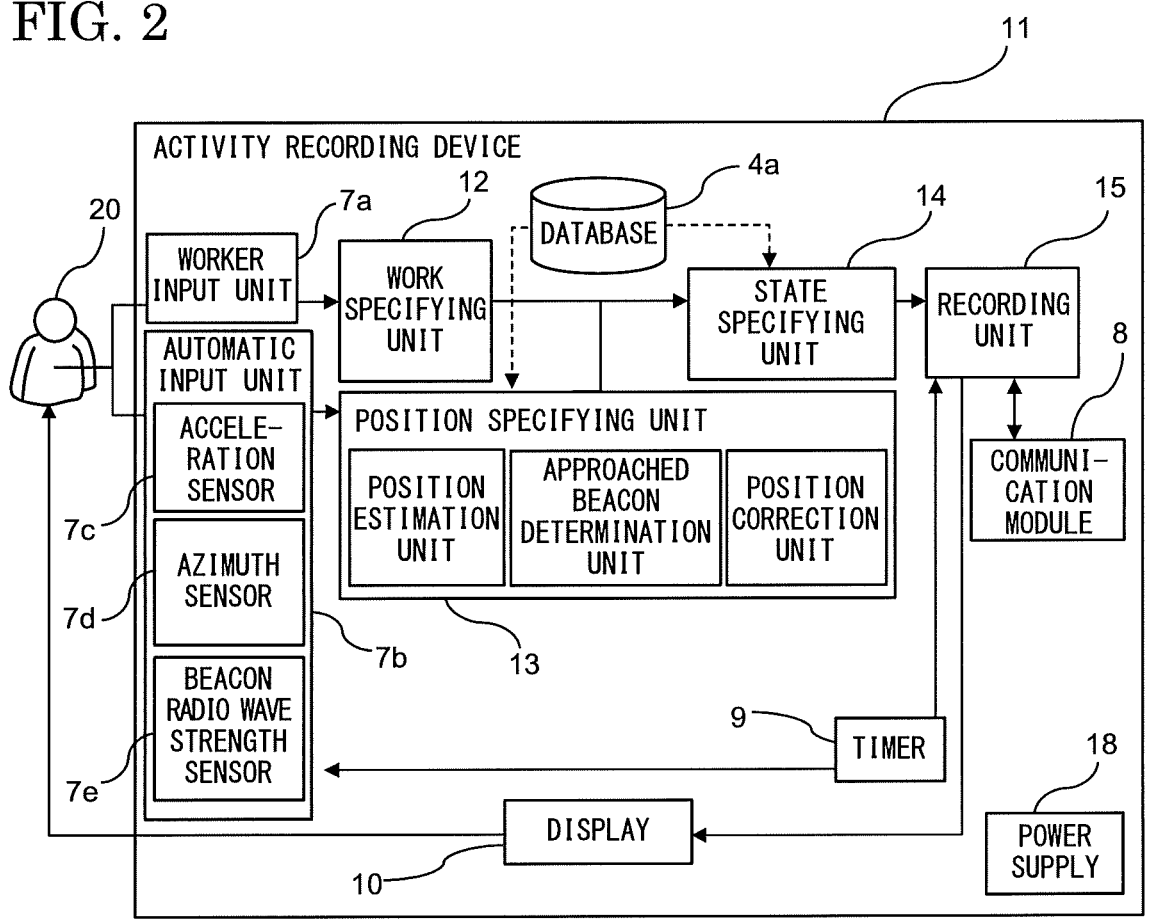
FIG. 2 is a functional configuration diagram of the activity recording device according to embodiment 1.

FIG. 2 is a functional configuration diagram of the activity recording device 11 according to embodiment 1. The activity recording device 11 includes the worker input unit 7a, the automatic input unit 7b, a work specifying unit 12, a position specifying unit 13, a state specifying unit 14, the database 4a, a recording unit 15, the timer 9, the communication module 8, the display 10, and a power supply 18. The automatic input unit 7b includes an acceleration sensor 7c, an azimuth sensor 7d, and a beacon radio wave strength sensor 7e. The position specifying unit 13 includes a position estimation unit, an approached beacon determination unit, and a position correction unit.

The work specifying unit 12 receives data for specifying a work of the worker 20, via the worker input unit 7a from the worker 20. The worker 20 inputs an ID (abbreviation for identification) to the worker input unit 7a. The ID of the worker 20 is provided with information about a work included in later-described relevance data and assigned to the worker 20 in advance, and the work of the worker 20 is specified on the basis of the ID. Specific examples of the worker input unit 7a include a keyboard and a numerical keypad, which are not restrictive. An IC card reading unit, a face recognition camera, a finger print recognition sensor, or the like may be used as the worker input unit 7a, as necessary. The display screen of the display 10 may be formed to be a touch panel so as to also serve as the worker input unit 7a.

The position specifying unit 13 receives outputs from the acceleration sensor 7c, the azimuth sensor 7d, and the beacon radio wave strength sensor 7e included in the automatic input unit 7b. In addition, the position specifying unit 13 receives beacon coordinate information which is position data of the coordinates of a plurality of beacons used at the production site, from the database 4a. Using the outputs from the sensors and the beacon coordinate information that have been received, the position specifying unit 13 calculates the position coordinates of the worker 20 by a position estimation unit, an approached beacon determination unit, and a position correction unit. The position coordinates are associated with a position in the relevance data described later, and the position specifying unit 13 specifies the position of the worker 20.

Figure 3:
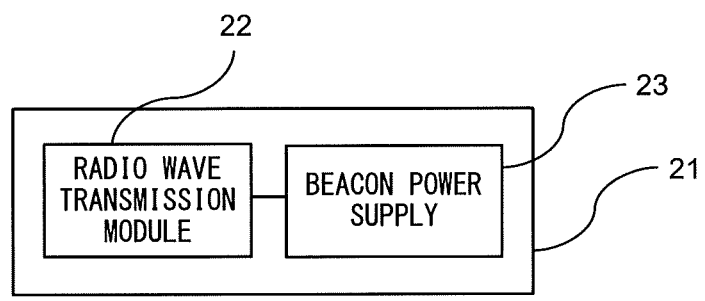
FIG. 3 is a diagram showing the schematic configuration of a beacon according to embodiment 1.

FIG. 3 is a diagram showing the schematic configuration of one beacon 21 provided in the production site. The beacon 21 is a terminal composed of a radio wave transmission module 22 and a beacon power supply 23, and has approximately a size smaller than a small-sized mobile phone. Each beacon 21 has an individual ID and information about the ID is added to a beacon radio wave that is transmitted from the radio wave transmission module 22. Each beacon 21 continues to transmit a beacon radio wave constantly, irrespective of whether or not there is a reception counterpart. The beacon radio wave strength sensor 7e is a module that receives a beacon radio wave transmitted from each beacon 21.

Figure 4:
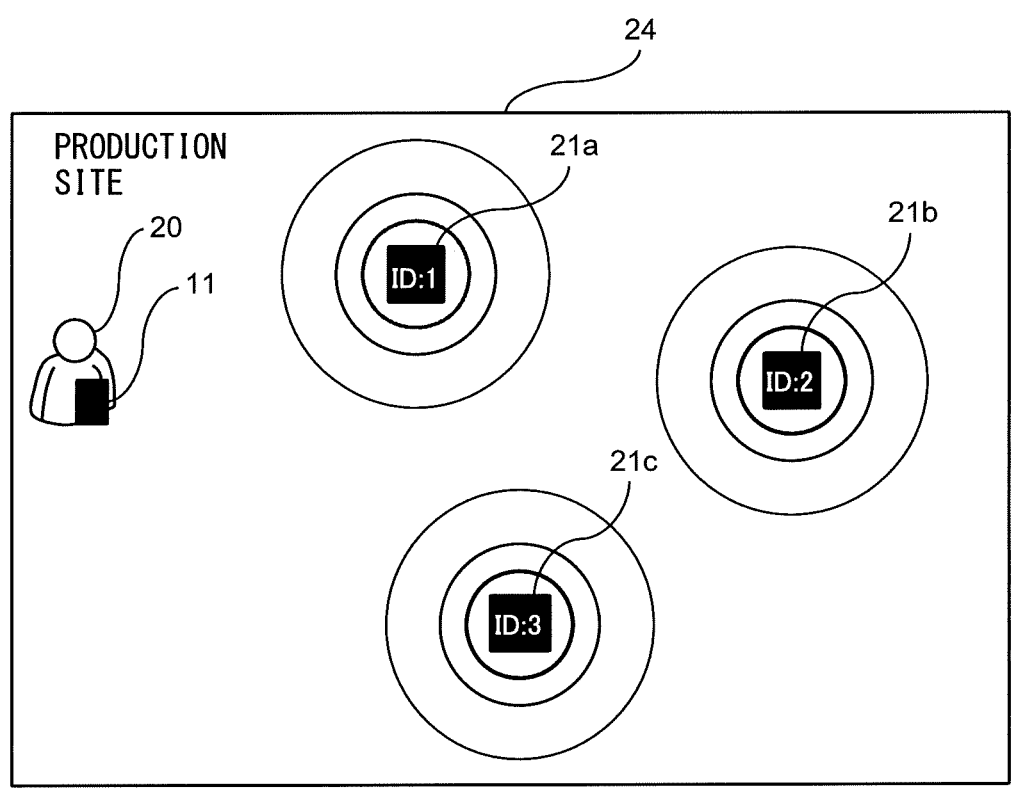
FIG. 4 is a diagram showing an example of installation of beacons and the activity recording device according to embodiment 1.

FIG. 4 is a diagram showing an example of installation of the activity recording device 11 and the beacons 21. The worker 20 carries the activity recording device 11 with him/her for recording activity of the worker 20 who moves in the production site 24. The possible locations to which the worker 20 should move in the production site 24 are limited to a plurality of points such as production machines (apparatuses), component supply shelves, and a station/rest area, for example. The beacons 21 having individual IDs are provided at locations, in the production site 24, for which movement thereto by the worker 20 is to be detected. FIG. 4 shows an example in which three beacons 21a, 21b, 21c respectively having ID1, ID2, ID3 are provided in the production site 24, but the number of beacons actually provided is optional. In FIG. 4, the beacon radio wave strength sensor 7e in the activity recording device 11 carried by the worker 20 receives beacon radio waves from the three beacons 21a, 21b, 21c.

The state specifying unit 14 narrows down the possible states of the worker 20 from the relevance data stored in advance in the database 4a, in accordance with the work of the target worker 20 specified by the work specifying unit 12 and the position of the worker 20 specified by the position specifying unit 13, and specifies the state of the worker 20. FIG. 5 shows an example of the relevance data. The relevance data includes fields for the work, position, and state of the worker 20, and is prescribed with these elements associated with each other. In FIG. 5, relevance data of two kinds of works, i.e., line work A and water spider B are shown as an example. Here, the line work refers to a work of performing assembly in an assembly line. The water spider work refers to a work involving movements not at a fixed position, such as supplying materials or conveying products in the production site. The worker 20 whose work is prescribed as line work A performs an assembly work in the assembly line 1, as basic activity in the production site 24. If the position of the worker 20 whose work is prescribed as line work A is specified as assembly line 2, the state is specified as help for line 2. Using the relevance data improves accuracy in specifying the state, as compared to the case of specifying the state from the specified position alone.

The recording unit 15 records the work, position, and state of the worker 20 specified by the work specifying unit 12, the position specifying unit 13, and the state specifying unit 14, as activity data in association with an activity time based on the timer 9. In the recording unit 15, the activity data of the worker 20 is stored in the storage 4b in the main memory 4.

The communication module 8 is connected to the recording unit 15, and the activity data stored in the storage 4b can be analyzed by an external personal computer (PC). The communication module 8 can perform transmission and reception of the contents of the activity data to and from an external device. The activity data is sent to the display 10, and the display 10 indicates work record data to the worker 20.

The activity recording device 11 has the power supply 18 independently therein. Therefore, the worker 20 can carry the activity recording device 11 with him/her. By the activity recording device 11 being carried, the activity recording device 11 can continue to constantly record the activity of the worker 20 moving in the production site 24.

Figure 6:
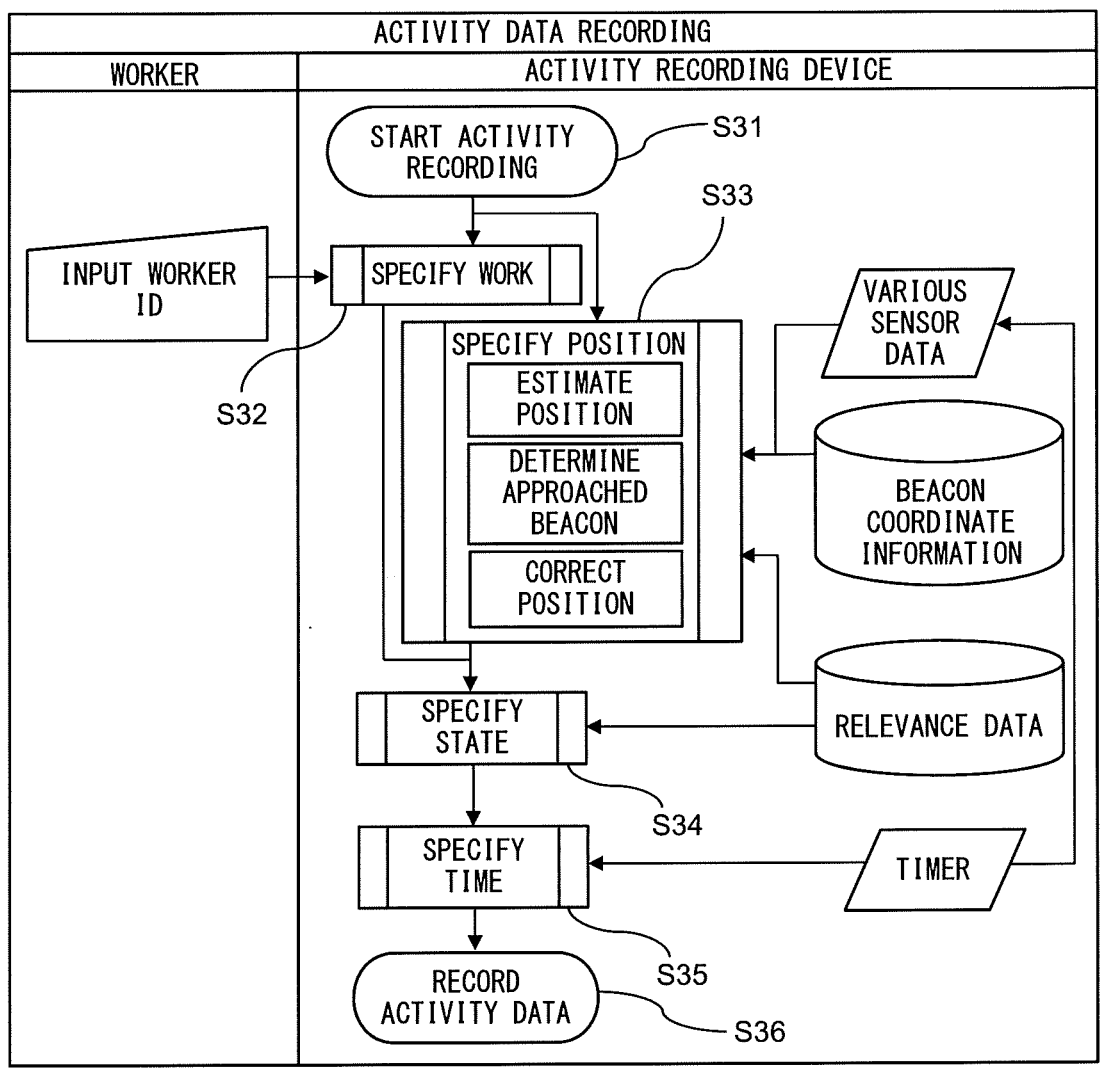
FIG. 6 is a flowchart for recording activity data of a worker in the activity recording device according to embodiment 1.

FIG. 6 is a flowchart for recording activity data of the worker 20 in the activity recording device 11 according to embodiment 1. It is noted that the process shown in the flowchart is performed on the basis of the activity recording program stored in the program memory 2.

When recording of activity is started (step S31 in FIG. 6), the worker 20 inputs the ID via the worker input unit 7a. The work specifying unit 12 specifies a work set in advance for the worker 20 (in FIG. 6, step S32: work specifying step).

Figure 7:
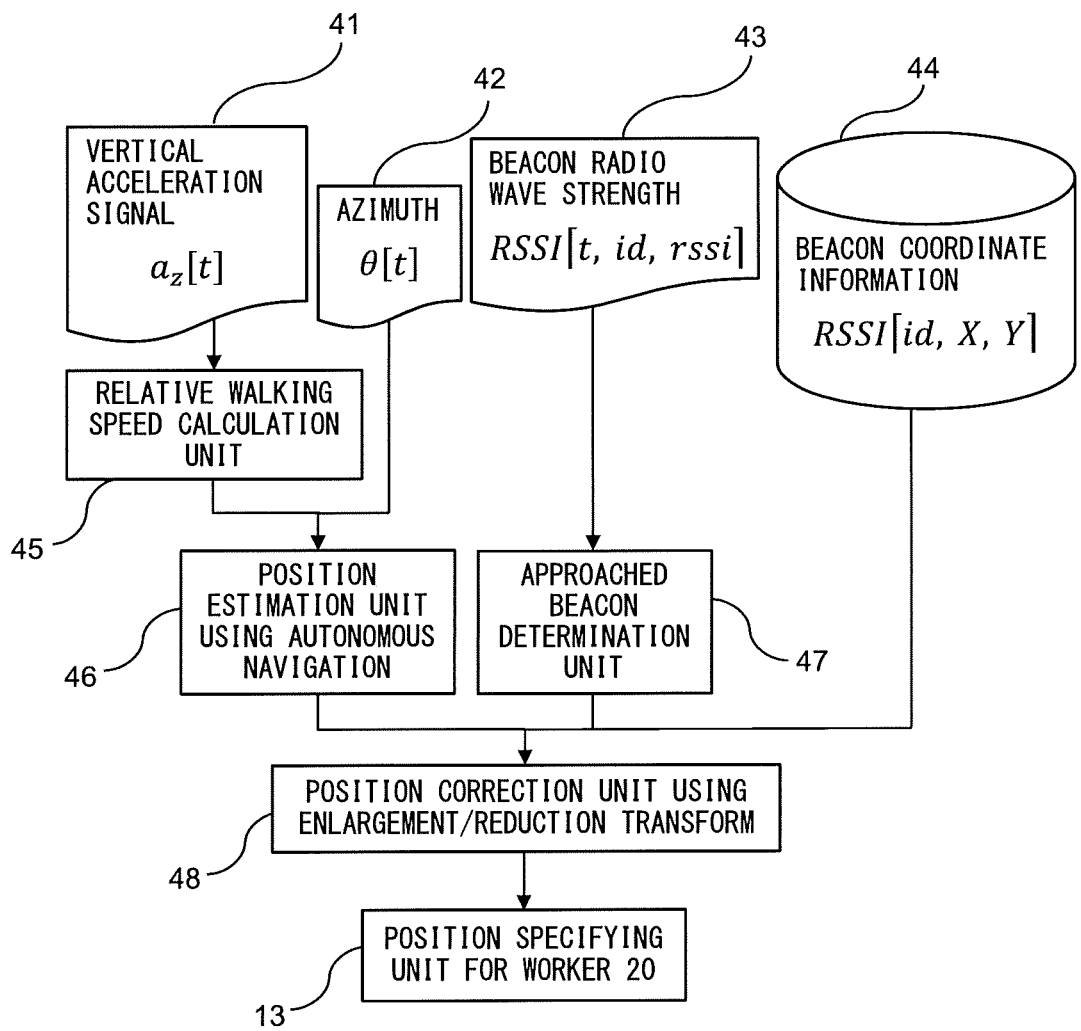
FIG. 7 is a processing flowchart for specifying the position of a worker, according to embodiment 1.

Operation for specifying the position of the worker 20 performed in the position specifying unit 13 (FIG. 6, step S33: position specifying step) will be described with reference to FIG. 7. FIG. 7 is a processing flowchart for specifying the position of the worker. The position specifying unit 13 receives a vertical acceleration signal 41 from the acceleration sensor 7c, an azimuth 42 from the azimuth sensor 7d, a beacon radio wave strength 43 from the beacon radio wave strength sensor 7e, and beacon coordinate information 44 from the database 4a shown in FIG. 2. From the vertical acceleration signal 41, a relative walking speed calculation unit 45 calculates a relative walking speed which is the movement speed of the worker 20. From the calculated relative walking speed and the history of a direction indicated by the azimuth 42, a position estimation unit 46 using autonomous navigation estimates the position coordinates of the worker 20 (position estimation step). From the beacon radio wave strength 43, an approached beacon determination unit 47 determines the beacon ID of the beacon that is most approached by the worker 20 in the production site. From a result of determination for the approached beacon ID and the beacon coordinate information 44, a position correction unit 48 corrects the estimated position coordinates of the worker 20 (position correction step). On the basis of the corrected position coordinates of the worker 20, the position specifying unit 13 refers to the relevance data, to specify the position of the worker 20.

Figure 8:
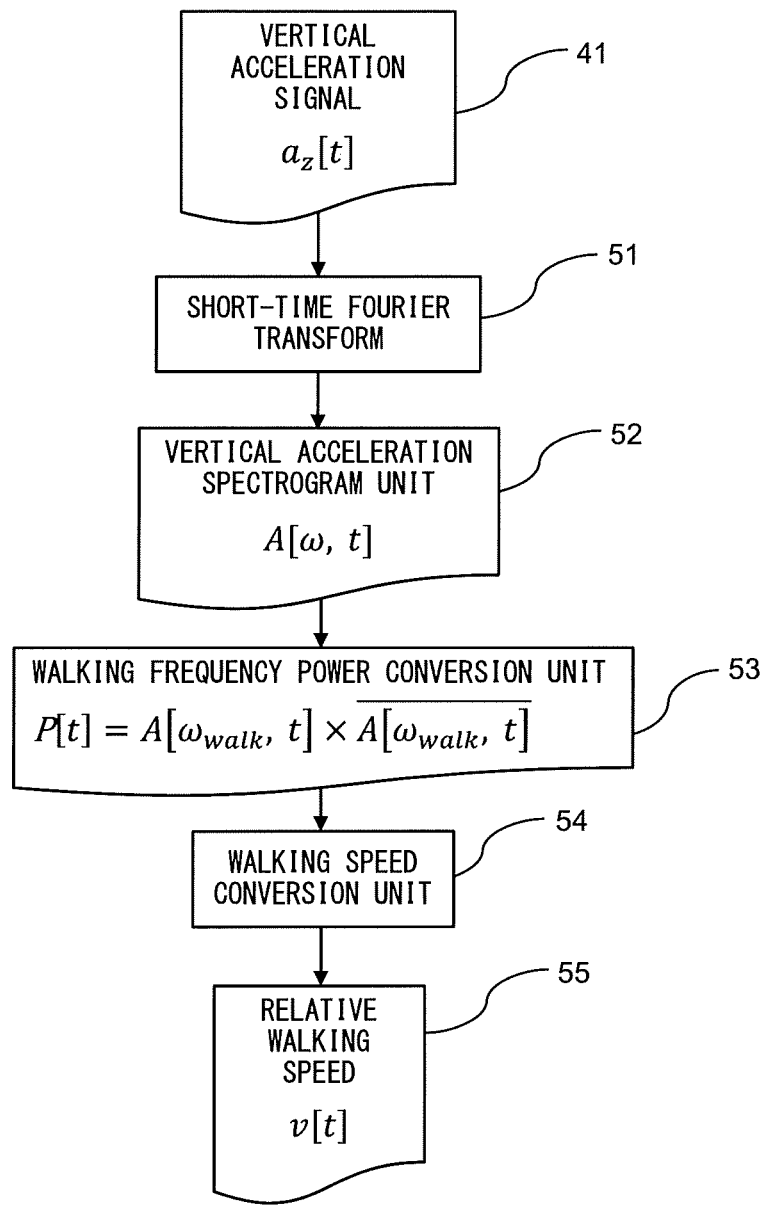
FIG. 8 is a processing flowchart for calculating a relative walking speed from a vertical acceleration signal, according to embodiment 1.
Figure 10:
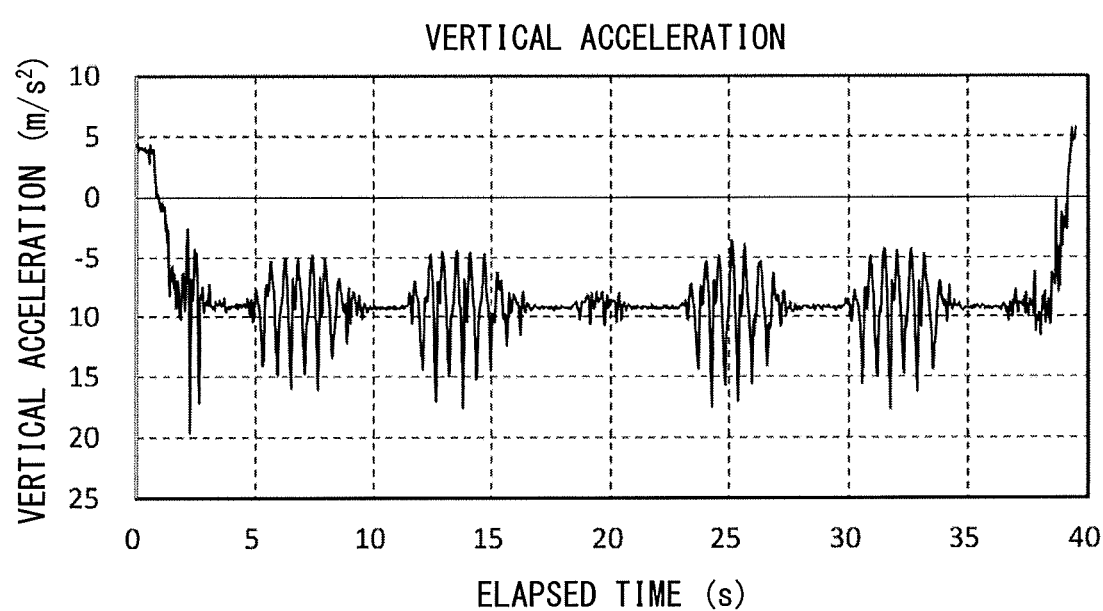
FIG. 10 shows an example of a vertical acceleration signal with respect to the elapsed time, according to embodiment 1.
Figure 11:
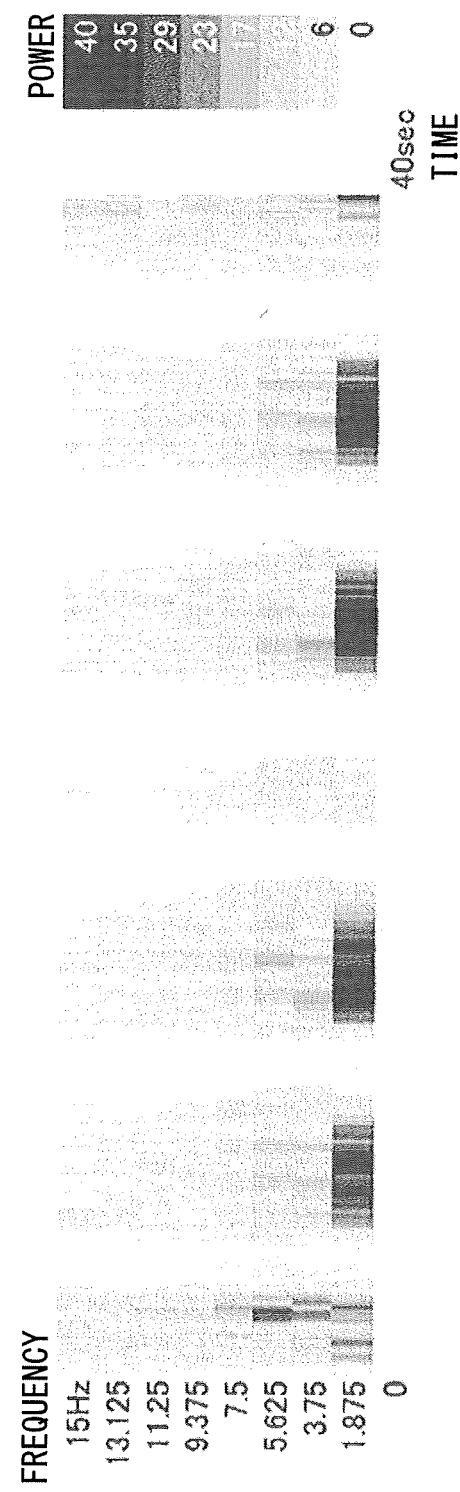
FIG. 11 shows an example in which a vertical acceleration signal is subjected to short-time Fourier transform to represent a vertical acceleration spectrogram in a time-frequency domain, according to embodiment 1.
Figure 12:
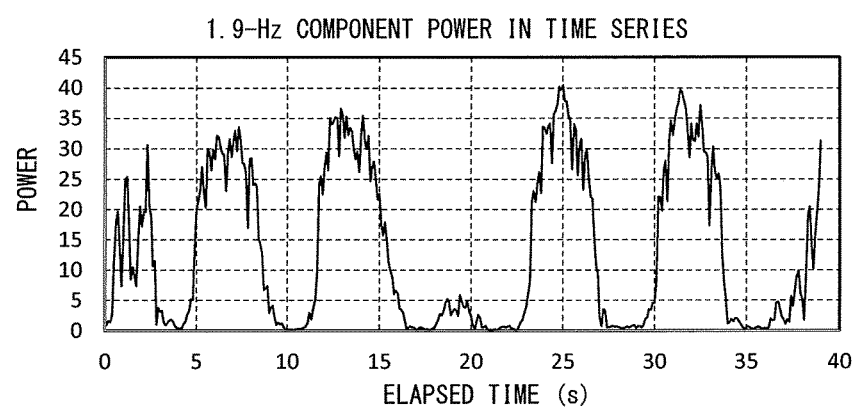
FIG. 12 shows an example of conversion to component power P for a frequency closest to 2 Hz in the vertical acceleration spectrogram, according to embodiment 1.
Figure 13:
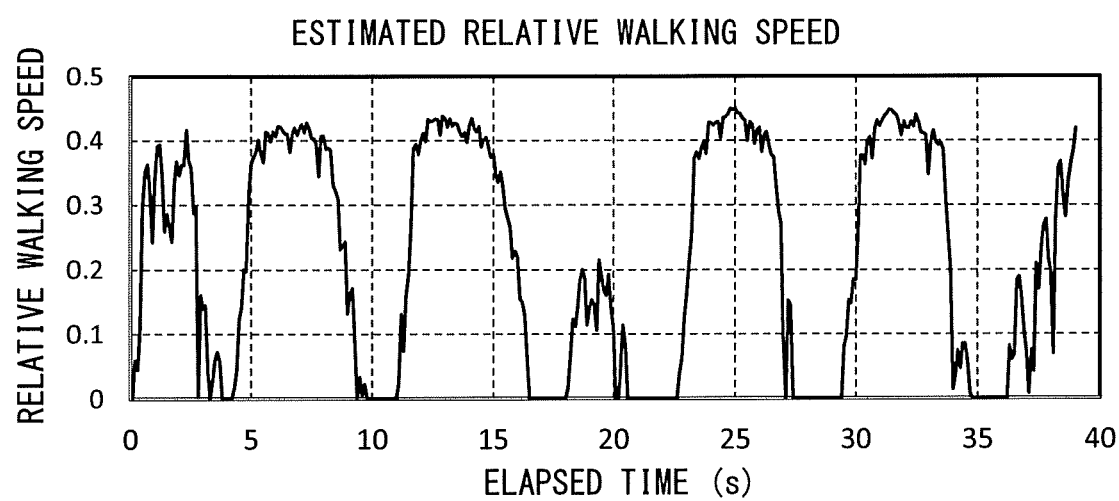
FIG. 13 shows an example of a calculated relative walking speed, according to embodiment 1.

The details of processing by each unit for specifying the position of the worker 20 will be described below. First, the processing by the relative walking speed calculation unit 45 will be described. FIG. 8 is a processing flowchart for calculating a relative walking speed 55 from the vertical acceleration signal 41. The processing flowchart shown in FIG. 8 will be described. FIG. 9 shows an example of values of the vertical acceleration signal 41, and shows sequences of times acquired from the timer 9 and values of the vertical acceleration. FIG. 10 shows an example of the vertical acceleration signal 41 with respect to the elapsed time. FIG. 11 shows an example in which the vertical acceleration signal 41 is subjected to short-time Fourier transform and processed to represent a vertical acceleration spectrogram in a time-frequency domain. FIG. 12 shows an example of conversion to component power P[2 Hz, t] for a frequency closest to 2 Hz in the vertical acceleration spectrogram. FIG. 13 shows an example of the calculated relative walking speed 55.

The relative walking speed calculation unit 45 receives the vertical acceleration signal 41 (see FIG. 9 and FIG. 10) from the acceleration sensor 7c of the automatic input unit 7b. A short-time Fourier transform unit 51 performs short-time Fourier transform on the vertical acceleration signal 41, and then a vertical acceleration spectrogram unit 52 processes the result to represent a vertical acceleration spectrogram in a time-frequency domain (for the details of the processing, see Matani Ayumu "Digital signal process engineering", SHOKODO, 2004). In FIG. 11 showing the result of the processing, power for each frequency with respect to time is shown in gray scale in accordance with power. Next, a walking frequency power conversion unit 53 performs conversion to component power for a frequency closest to 2 Hz in the vertical acceleration spectrogram (for the result, see FIG. 12). The frequency for which power is obtained by short-time Fourier transform on a signal acquired at certain sampling intervals is automatically determined, and therefore, 1.9-Hz component power is obtained here. A walking speed conversion unit 54 calculates a relative walking speed v[t] by the following expression, using component power P for a frequency closest to 2 Hz in the vertical acceleration spectrogram shown in FIG. 12 (for the details of the expression, see SUSUMAGO MITSUTOSHI, et al. "Estimation of walking Speed by Signal Energy of Frequency Band of Walking Acceleration", Proceedings SICE annual conference 2003 in Fukui: Aug. 4-6, 2003).

$$v[t]=\text{Max}(\log P[2\ Hz,t],0) \quad \text{[Mathematical 1]}$$

Walking speed conversion is performed using the above expression, whereby the relative walking speed 55 is calculated (for the result, see FIG. 13).

Figure 14:
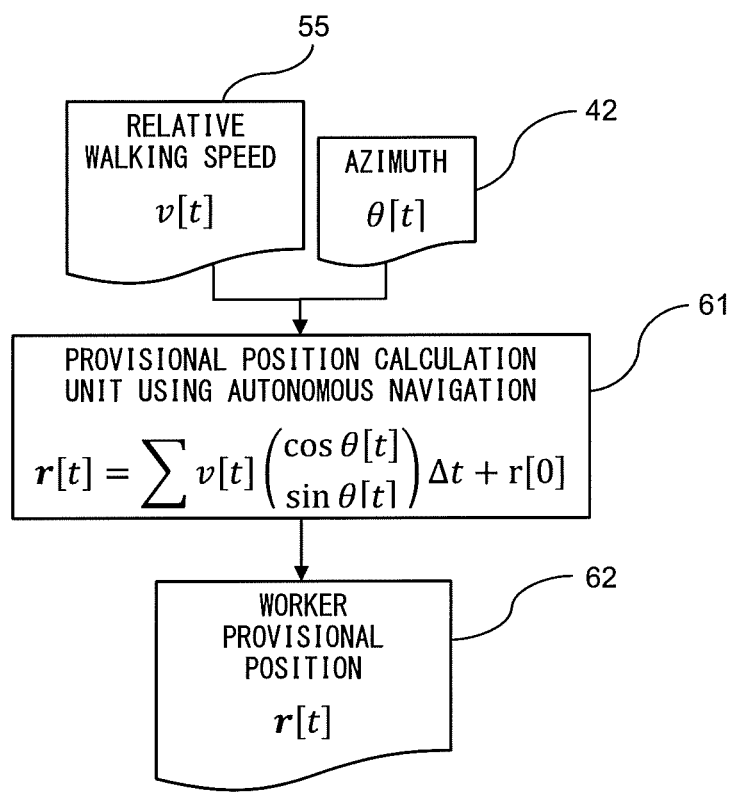
FIG. 14 shows a processing flowchart for calculating a provisional position of a worker by autonomous navigation, according to embodiment 1.

Next, the processing by the position estimation unit 46 using autonomous navigation will be described. FIG. 14 is a processing flowchart in which the position estimation unit 46 using autonomous navigation calculates a worker provisional position 62 of the worker 20 by autonomous navigation on the basis of the relative walking speed 55 and the history of the direction indicated by the azimuth 42. As the relative walking speed 55, the one calculated by the relative walking speed calculation unit 45 is used.

Figure 16:
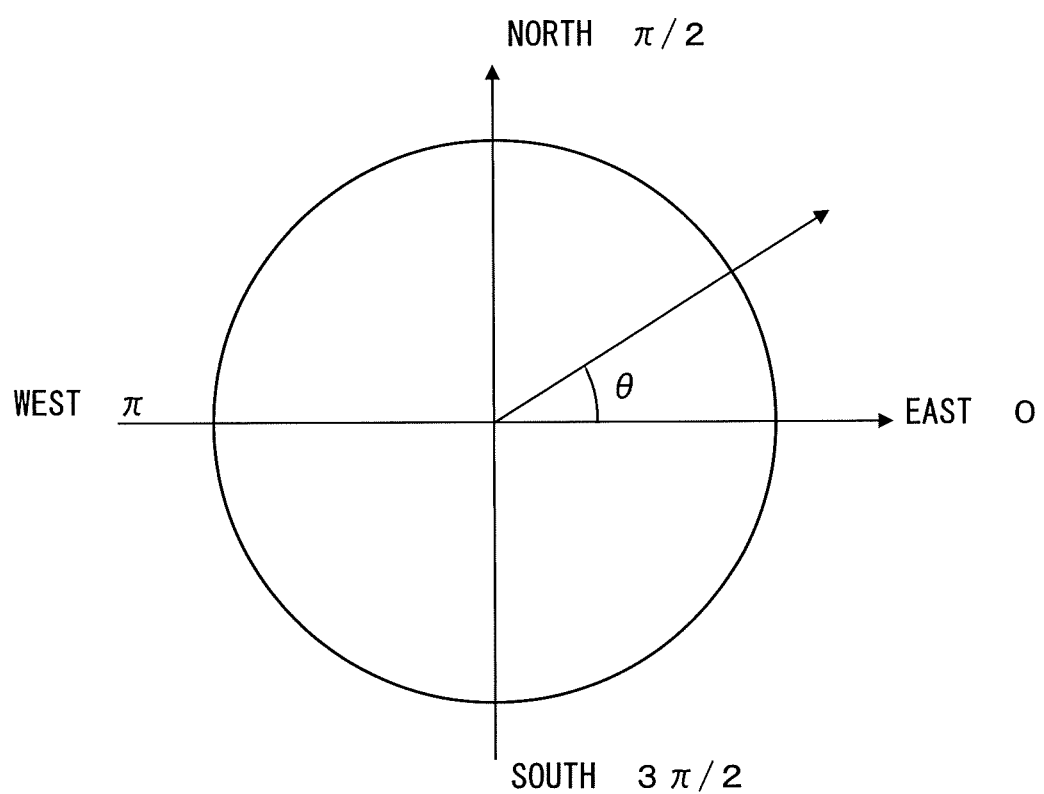
FIG. 16 illustrates expression of the azimuth, according to embodiment 1.

FIG. 15 shows an example of the azimuth 42 outputted from the azimuth sensor 7d of the automatic input unit 7b, to the position estimation unit 46 using autonomous navigation. The azimuth 42 is sequences of times acquired from the timer 9 and values of the azimuth in which the worker is directed, as shown in FIG. 15. The value of the azimuth 42 is expressed as a value measured by circular measure in the counterclockwise direction with the east set as 0, as shown in FIG. 16. The unit for circular measure is radian, which is normally omitted. Therefore, the unit is omitted also in FIG. 15 and FIG. 16. It is noted that the expression of the azimuth is not limited thereto. The value for east may be any real number not equal to 0, or a value based on degree measure may be used therefor, instead of circular measure.

From the inputted history of the direction indicated by the azimuth 42 and the inputted relative walking speed 55, a provisional position of the worker 20 is calculated by autonomous navigation 61. A provisional position r[t] of the worker 20 is calculated by the following expression, where v[τ] is the walking speed at time τ, θ[τ] is the azimuth, and Δt[τ] is the sampling interval, and thus the provisional position of the worker 20 is estimated. In the expression, r[0] is the initial position of the worker 20. Here, the coordinate axes are the same as those for the azimuth shown in FIG. 16.

$$r[t]=\sum_{\tau=0}^{t} v[\tau]\begin{pmatrix} \cos\theta[\tau] \\ \sin\theta[\tau] \end{pmatrix}\Delta t[\tau]+r[0] \quad \text{[Mathematical 2]}$$

Figure 17:
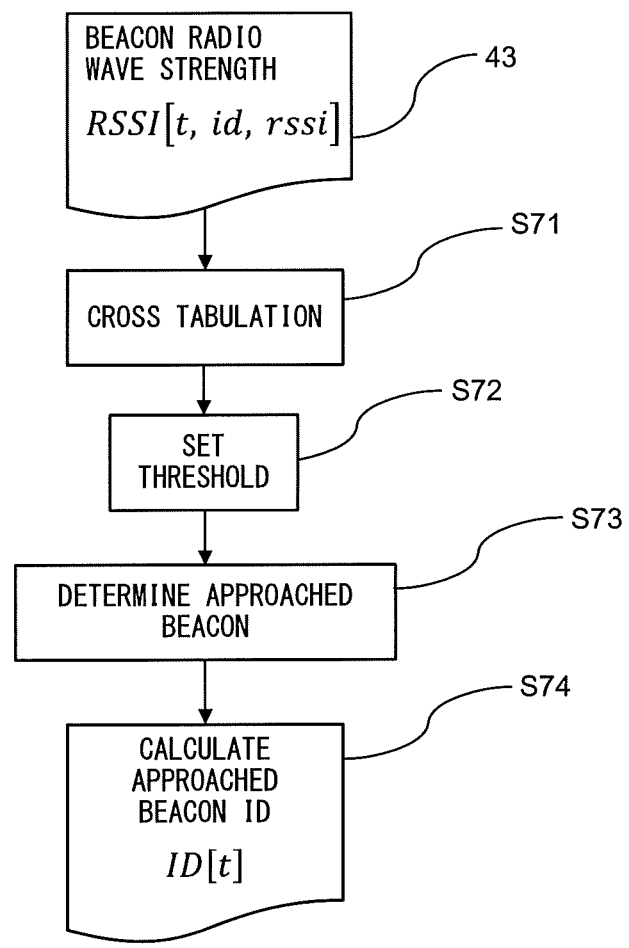
FIG. 17 is a processing flowchart for calculating an approached beacon ID, according to embodiment 1.

Next, the processing by the approached beacon determination unit 47 will be described. FIG. 17 is a processing flowchart in which the approached beacon determination unit 47 calculates an approached beacon ID 74 of the beacon that is most approached by the worker 20 in the production site on the basis of the beacon radio wave strength 43 at each time.

FIG. 18 shows an example of the beacon radio wave strength 43 outputted from the beacon radio wave strength sensor 7e of the automatic input unit 7b, to the approached beacon determination unit 47. The beacon radio wave strength 43 is sequences of times acquired from the timer 9, IDs of the beacons from which beacon radio waves are received, and received signal strengths of the beacon radio waves, as shown in FIG. 18.

Figure 19:
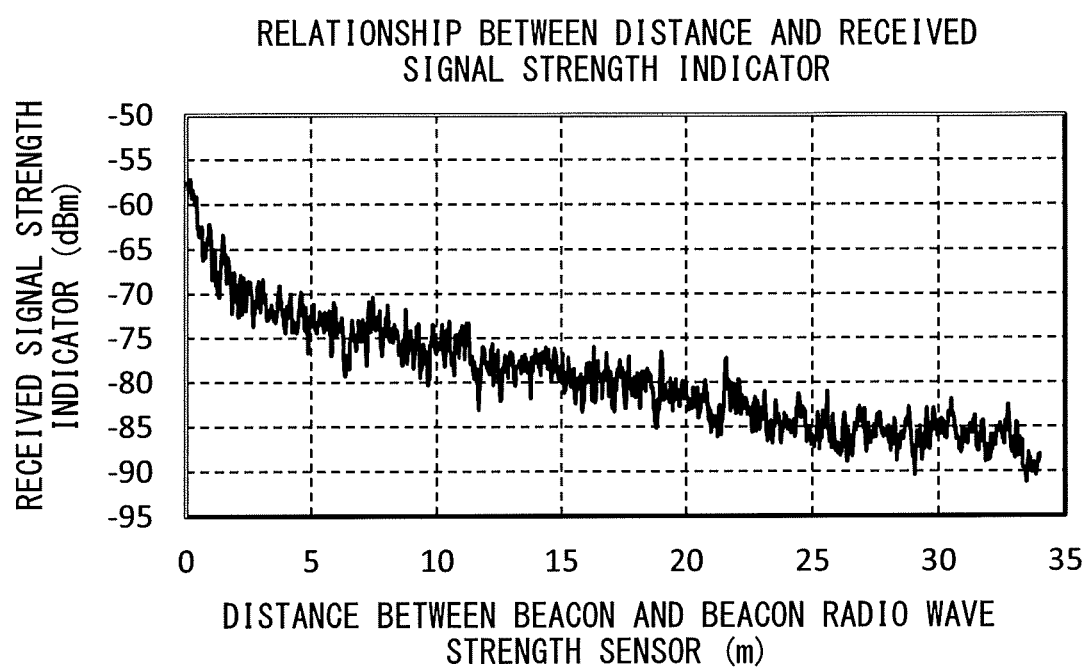
FIG. 19 shows the relationship between an RSSI and the distance between a specific beacon and a beacon radio wave strength sensor, according to embodiment 1.

The beacon radio wave strength sensor 7e receives the beacon ID that is the transmission source of the beacon radio wave, and a received signal strength indicator (hereinafter, abbreviated as RSSI) of the beacon radio wave. FIG. 19 shows the relationship between the RSSI and the distance between a specific beacon 21 and the beacon radio wave strength sensor 7e. As shown in FIG. 19, there are characteristics in which the RSSI increases with decrease in the distance between the beacon 21 and the beacon radio wave strength sensor 7e, i.e., the activity recording device 11.

FIG. 20 shows an example of beacon IDs and normalized RSSIs at each time t. In FIG. 20, a cross table (hereinafter, referred to as cross table) is obtained by performing cross tabulation (step S71 in FIG. 17) so that the normalized RSSIs are indicated for the respective beacon IDs at each time t. FIG. 21 shows an example of the cross table in which a threshold value for the RSSI based on which it is determined that each beacon 21 is approached, is set. The threshold value setting (step S72 in FIG. 17) is made for each beacon 21. As the way of setting the threshold value, for example, a simple arithmetic mean or a median of the RSSI recorded for each beacon, or an upper X percentile point thereof, is used. However, any method may be used. In FIG. 21, the threshold value is set using a median.

FIG. 22 shows an example of a result when the beacon ID of the beacon that is most approached at each time t is determined. The determination of the beacon ID of the beacon that is most approached (step S73 in FIG. 17) is performed by the following processing flow 1 and processing flow 2 being sequentially performed at each time t. As a result of the determination, the approached beacon ID at each time t, i.e., an ID sequence ID[t] (step S74 in FIG. 17), is calculated.

Processing flow 1: at each time t, the beacon ID that corresponds to the greatest RSSI is extracted. The greatest value of RSSI at each time t in FIG. 21 and FIG. 22 is underlined. The beacon ID for the underlined RSSI is the beacon ID that is extracted. For example, at time 1 in FIG. 21, the beacon 2 is extracted.

Processing flow 2: at time t, the greatest value of RSSI is compared with the threshold value for the extracted beacon ID. As a result of the comparison, if the greatest value of RSSI is greater, it is determined that the beacon corresponding to the extracted beacon ID is most approached. Then, the extracted beacon ID is recorded in the ID sequence ID[t]. For example, at time 1 in FIG. 22, 2 is recorded as the beacon ID.

In the processing flow 2, as a result of the comparison, if the greatest value of RSSI is smaller, it is determined that no beacons are approached. Then, 0 is recorded in the ID sequence ID[t]. For example, at time 2 in FIG. 22, 0 is recorded as the beacon ID.

As described above, through the processing flows 1 and 2, the beacon ID of the most approached beacon is determined, so that the beacon ID of the most approached beacon is recorded in the ID sequence ID[t], or it is determined that no beacons are approached, so that 0 is recorded.

Figure 23:
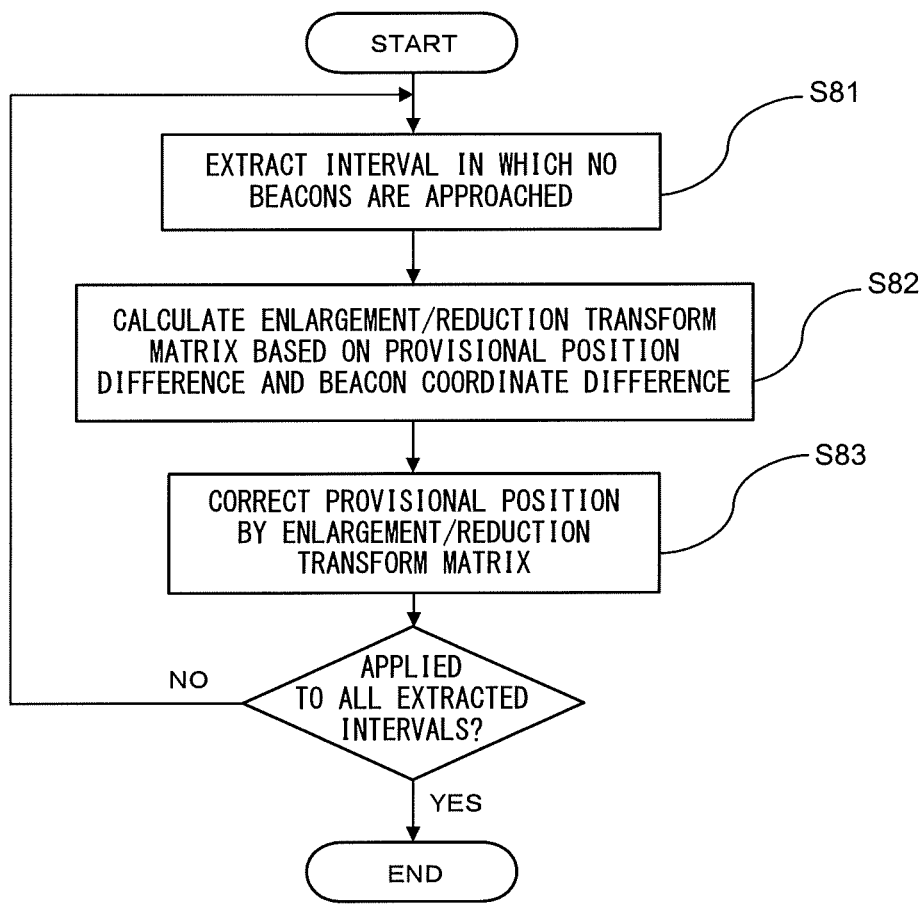
FIG. 23 is a flowchart for correcting the position of a worker through enlargement/reduction transform, according to embodiment 1.

Next, processing by the position correction unit 48 will be described. FIG. 23 is a flowchart for the position correction unit 48 to correct the position of the worker 20 through enlargement/reduction transform of the worker provisional position 62, on the basis of the approached beacon ID and the beacon coordinate information 44. By the correction for the position of the worker 20, the position of the worker 20 is specified. As the worker provisional position 62, a value calculated by the position estimation unit 46 using autonomous navigation is used, and as the approached beacon ID, a value recorded by the approached beacon determination unit 47 is used.

FIG. 24 shows an example of the beacon coordinate information 44 stored in the database 4a. The beacon coordinate information 44 includes the ID, X coordinate, and Y coordinate of each beacon 21 in the production site 24. The beacon coordinate information 44 is stored in the database 4a in advance. In FIG. 24, the beacon coordinate information 44 about each of ten beacons 21 provided in the production site 24, is shown as an example. It is noted that the coordinate axis coincides with the axis of the azimuth in FIG. 13, the unit of the coordinate value is optional, and the unit on each coordinate axis in FIG. 24 is 0.5 m.

The position correction unit 48 performs the following process. First, an interval in which the worker 20 does not approach any beacon 21 is extracted (step S81 in FIG. 23). The ID sequence ID[t] received from the approached beacon ID is confirmed from the smallest time t, to specify a time t1 at which ID[t1−1]≠0 and ID[t1]=0 are satisfied. Next, the ID[t] is confirmed starting from time t1, to specify a time t2 at which ID[t2]=0 and ID[t2+1]≠0 are satisfied. In this case, for any time t in a range of t1≤t≤t2, ID[t]=0 is satisfied. Therefore, this interval is an interval in which the activity recording device 11 does not approach any beacon 21. This interval is extracted as an interval in which no beacons 21 are approached. For example, in FIG. 22, t1=t2=2 is the interval in which no beacons 21 are approached.

Next, an enlargement/reduction transform matrix based on a provisional position difference and a beacon coordinate difference is calculated (step S82 in FIG. 23). First, a difference d12 in the provisional position in the extracted interval t1≤t≤t2, is calculated as follows.

$$d_{12}[t] = r[t_2] - r[t_1] = \sum_{\tau=t_1}^{t_2} v[\tau] \begin{pmatrix} \cos \theta[\tau] \\ \sin \theta[\tau] \end{pmatrix} \Delta t[\tau] \quad \text{[Mathematical 3]}$$

Next, a beacon coordinate difference, i.e., a difference R12 between the actual coordinates of the approached beacons before and after the interval, is calculated. Where the coordinates of the approached beacon for ID[t1−1] are defined as (X1, Y1), and the coordinates of the approached beacon for ID[t2+1] are defined as (X2, Y2), the difference R12 between the actual coordinates of the beacons is represented as follows.

$$R_{12} = \begin{pmatrix} X_2 - X_1 \\ Y_2 - Y_1 \end{pmatrix} \quad \text{[Mathematical 4]}$$

Here, if a transform matrix from the provisional position to the actual coordinates is denoted by M12, the difference R12 between the actual coordinates of the beacons is represented by a product of the transform matrix M12 and the difference d12 in the provisional position, as follows.

$$R_{12} M_{12} d_{12} \quad \text{[Mathematical 5]}$$

Further, if M is represented as enlargement/reduction transform, the following is obtained.

$$R_{12} = \begin{pmatrix} r \cos \theta & -r \sin \theta \\ r \sin \theta & r \cos \theta \end{pmatrix} d_{12} \quad \text{[Mathematical 6]}$$

By calculating r and θ that satisfy the above, the transform matrix M12 is determined. This becomes an enlargement/reduction transform matrix.

The position correction unit 48 finally performs correction for the provisional position by the enlargement/reduction transform matrix (step S83 in FIG. 23). By the correction for the provisional position, the position of the worker is specified. A corrected specified position R[t] at t in the extracted interval t1≤t≤t2 is calculated as follows.

$$R[t] = \begin{pmatrix} X_1 \\ Y_1 \end{pmatrix} + \sum_{\tau=t_1}^{t} v[\tau] M_{12} \begin{pmatrix} \cos \theta[\tau] \\ \sin \theta[\tau] \end{pmatrix} \Delta t[\tau] \qquad \text{[Mathematical 7]}$$

The above correction for the provisional position is applied to all the extracted intervals in which no beacons 21 are approached, whereby the position coordinates of the worker 20 can be specified.

Figure 25:
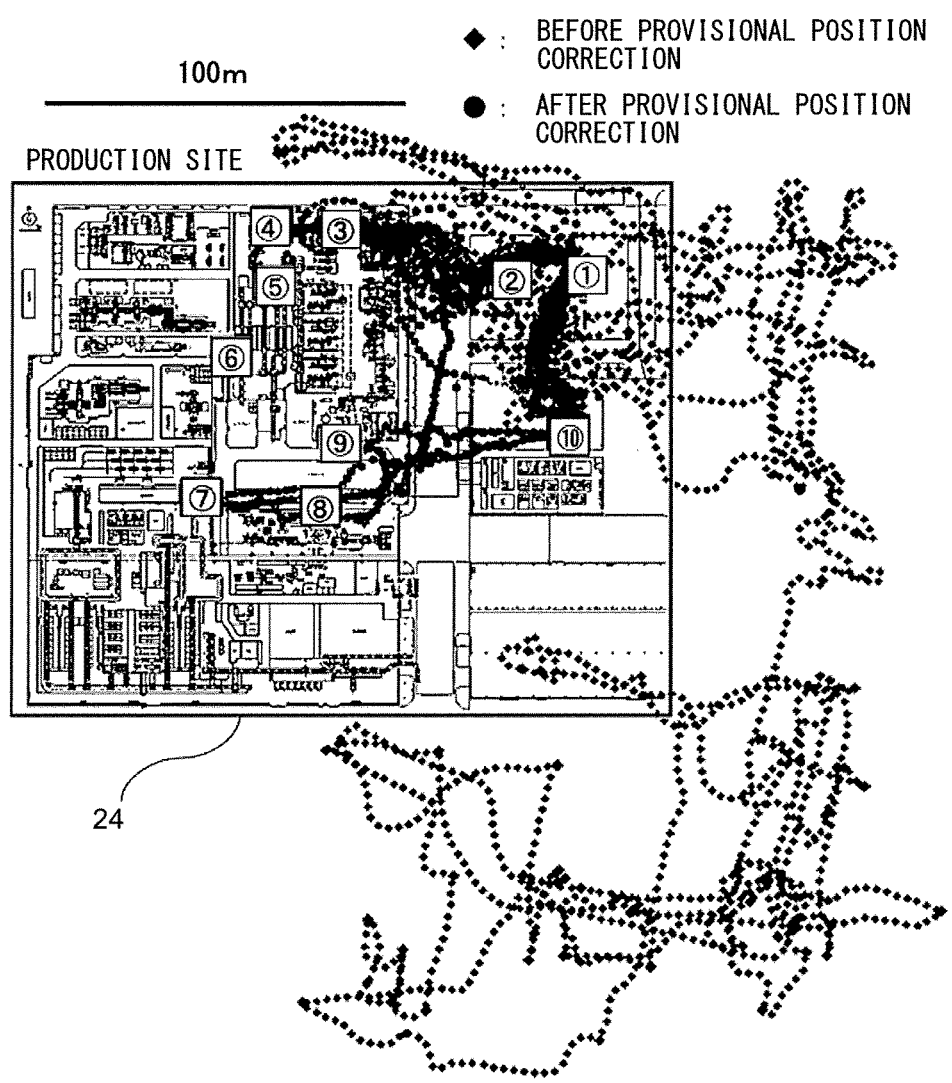
FIG. 25 shows an example of the positions of a worker before and after provisional position correction of the worker, according to embodiment 1.

FIG. 25 shows an example of the position coordinates of the worker 20 before and after the provisional position correction in the production site 24. The inside of a rectangular frame is the production site 24 for the worker 20. In the production site 24, the ten beacons 21 shown in FIG. 24 are provided. For example, Number 9 shown near the center of the production site 24 indicates the position where the beacon of which the beacon ID is 9 is provided. Although FIG. 4 schematically shows an example of installation of the beacons 21 in the production site 24, FIG. 25 shows an example in which the beacons 21 are installed in the actual production site 24. In FIG. 25, a mark ♦ indicates the trajectory of the position coordinates, before correction, of the worker 20 moving while carrying the activity recording device 11 with him/her. A mark ● indicates the trajectory of the position coordinates, after correction, of the worker 20 moving while carrying the activity recording device 11 with him/her. Before the correction, the position coordinates of the worker 20 include great error beyond the area of the production site 24. As a result of the correction, the position coordinates of the worker 20 fall within the area of the production site 24. By performing correction for the provisional position of the worker 20 using the information about the beacon 21, the position coordinates of the worker 20 are corrected, and the position of the worker 20 is specified with the corrected position coordinates. Accuracy of the position coordinates of the worker 20 is easily improved with a small calculation load, because only beacon coordinate information needs to be prepared beforehand.

Next, the state of the worker 20 is specified (in FIG. 6, step S34: state specifying step). The state specifying unit 14 receives information about the specified work of the worker 20 from the work specifying unit 12, and information about the specified position of the worker 20 from the position specifying unit 13. From the specified work of the worker 20 and the specified position of the worker 20, the state specifying unit 14 specifies the state of the worker 20, namely, the state of the work of the worker 20 in the production site 24, on the basis of the relevance data. Referring to the relevance data (see FIG. 5), the state specifying unit 14 narrows down the state that the worker 20 can have, on the basis of the specified work and the specified position of the worker 20. In the example shown in FIG. 5, if, for example, the work and the position are specified as work=line work A and position=assembly line 2, the state that the worker 20 can have is narrowed down as "help for line 2", and thus the state of the worker 20 is specified. In this way, in the activity recording device 11 according to embodiment 1, the state that the worker 20 can have in the production site 24 is specified on the basis of the relevance that allows estimation from specified work and position of the worker.

Next, the activity time of the worker 20 is specified (step S35 in FIG. 6). This processing is performed by the recording unit 15 in the activity recording device 11. The recording unit 15 receives data including the work, the position, and the state in combination, and adds an activity time to the data. Thus, the time taken for each state is recorded. Information about the activity time is inputted from the timer 9.

Finally, the recording unit 15 records, as activity data, data of a record of activity of the worker 20 including the work, the position, the state, and the activity time in combination, and thus activity recording is finished (step 36 in FIG. 6: recording step). The recorded data is transmitted to the outside via the communication module 8, so as to be utilized for productivity analysis and traceability management. In addition, the activity data is displayed on the display 10 of the activity recording device 11.

The activity recording device 11 according to embodiment 1 is configured such that, as the automatic input unit 7b, the acceleration sensor 7c, the azimuth sensor 7d, and the beacon radio wave strength sensor 7e are provided inside the activity recording device 11, but is not limited thereto. The worker 20 may have some or all of the above sensors separately from the activity recording device 11, and outputs from the respective sensors may be inputted to the automatic input unit 7b. In view of improvement in accuracy of outputs of the sensors, the positions of the sensors carried by the worker 20 may be set outside the activity recording device 11. In the above description, the walking speed for the worker 20 moving by walking in the production site 24 is calculated. However, without limitation thereto, for the worker 20 moving by movement means other than walking such as a forklift, the movement speed may be calculated.

As described above, in the activity recording device 11 according to embodiment 1, since only beacon coordinate information needs to be prepared beforehand, the position of the worker 20 can be specified with a small calculation load, and accuracy of the specified position of the worker 20 can be improved. In addition, activity data including the work, the position, the state, and the activity time in combination, which are useful for productivity analysis, can be accurately acquired by using the relevance data.

Embodiment 2

Figure 26:
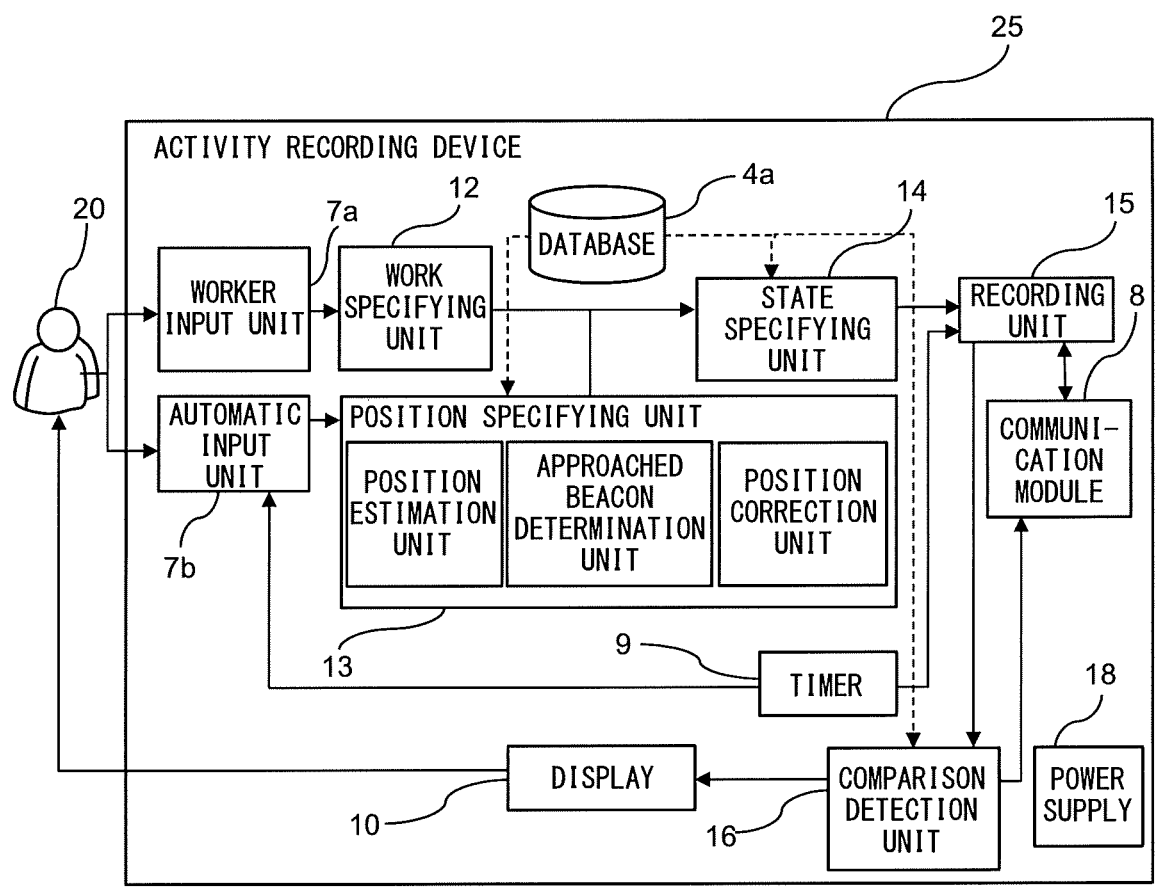
FIG. 26 is a functional configuration diagram of an activity recording device according to embodiment 2.

An activity recording device 25 according to embodiment 2 will be described. FIG. 26 is a functional configuration diagram of the activity recording device 25 according to embodiment 2, and FIG. 27 shows an example of standard activity data in which the position of the worker 20 is patterned (hereinafter, referred to as standard activity data). In embodiment 1, the recorded activity data of the worker 20 is not compared with standard activity data. In contrast, in embodiment 2, the activity recording device 25 is provided with a comparison detection unit 16 to compare the recorded activity data with standard activity data and thus detect a non-standard work different from the standard activity data. The other components are the same as those in embodiment 1, and therefore they are denoted by the same reference characters and description thereof is omitted.

FIG. 27 shows a pattern of a route through which a worker who performs a water spider work circulates, such that the positions are patterned in time series. The operation of circulating from an assembly line 1 to an assembly line 4 in this order in the site is set as the standard work. Therefore, the pattern in FIG. 27 is stored as the standard activity data in the database 4a in advance.

FIG. 28 shows an example of activity data recorded in a production site, regarding a water spider work (hereinafter, referred to as water spider B). The activity data shown in FIG. 28 is inputted from the recording unit 15 to the comparison detection unit 16. The comparison detection unit 16 compares the standard activity data stored in the database 4a and the inputted activity data. From comparison between the history of the position in the activity data and the pattern of positions in the standard activity data, it is found that, at 20:22 in FIG. 28, the worker goes to the assembly line 4 not via the assembly line 3, in the water spider B. At 20:22 in FIG. 28, a non-standard work of not passing through the assembly line 3, which is different from the standard activity data, occurs, and thus the comparison detection unit 16 detects the non-standard work.

The detected non-standard work is transmitted from the comparison detection unit 16 to the outside via the communication module 8, so as to be utilized for productivity analysis and traceability management. In addition, the detected non-standard work is displayed on the display 10 of the activity recording device 25 of the worker 20, so as to prompt the worker 20 who has performed the non-standard work, to return to the standard work.

As described above, in the activity recording device 25 according to embodiment 2, since the comparison detection unit 16 is provided, recorded activity data and standard activity data can be compared with each other. Through the comparison, a non-standard work different from the standard activity data can be detected. Owing to the detection of the non-standard work, it is possible to address the abnormal situation in which the non-standard work occurs, in the production site.

Embodiment 3

Figure 29:
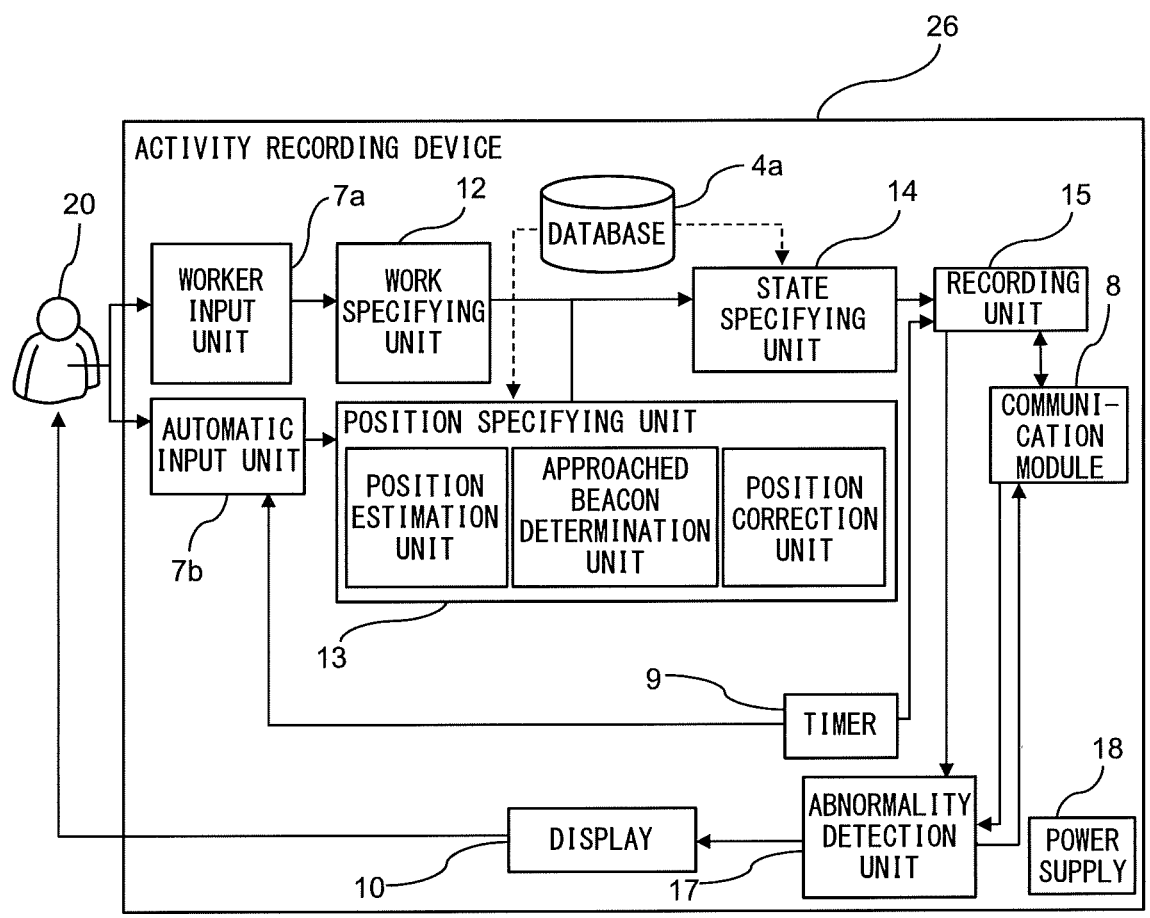
FIG. 29 is a functional configuration diagram of an activity recording device according to embodiment 3.
Figure 30:
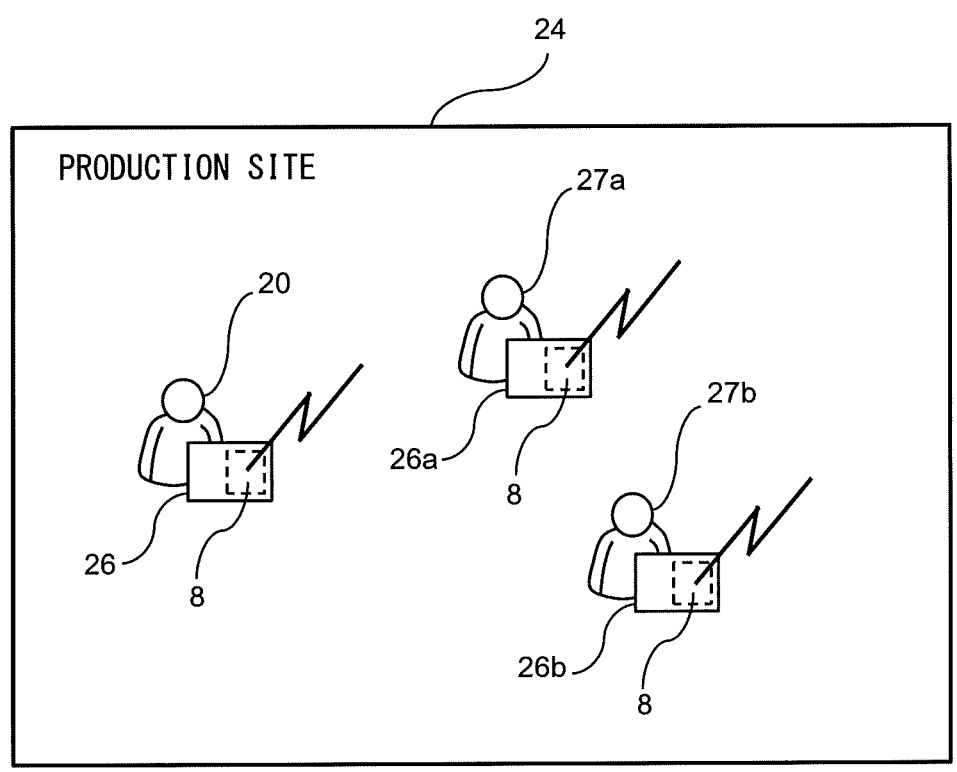
FIG. 30 shows an example in which a plurality of workers are doing activities in the same production site, according to embodiment 3.

An activity recording device 26 according to embodiment 3 will be described. FIG. 29 is a functional configuration diagram of the activity recording device 26 according to embodiment 3, and FIG. 30 shows an example in which a plurality of workers are doing activities in the same production site 24. In embodiment 1, activity data is not compared with those for other workers (hereinafter, referred to as workers 27a, 27b). In contrast, in embodiment 3, the activity recording device 26 is provided with an abnormality detection unit 17, to merge and compare received activity data of workers 27 and thus detect concentration of the positions of a plurality of workers. The other components are the same as those in embodiment 1, and therefore they are denoted by the same reference characters and description thereof is omitted.

The activity recording device 26 according to embodiment 3 transmits, via the communication module 8, the activity data of the worker 20 recorded by the activity recording device 26 carried by the worker 20, to other activity recording devices 26a, 26b carried by the workers 27a, 27b who are doing activities in the same production site 24. In addition, the activity recording device 26 receives, via the communication module 8, the activity data of the workers 27a, 27b recorded by the other activity recording devices 26a, 26b carried by the workers 27a, 27b.

The activity data of the workers 27a, 27b are inputted to the abnormality detection unit 17 from the communication module 8, and the abnormality detection unit 17 merges the activity data of the plurality of workers together with the activity data of the worker 20. FIG. 31 shows an example of the merged activity data. FIG. 31 shows data in which position information about three forklift workers at each identical time is merged. By merging the activity data about positions, it is possible to easily compare the positions where the respective workers are present at an identical time. Through the comparison, concentration of the positions of the plurality of workers can be detected. Each of the three forklift workers operates a forklift. Therefore, three forklifts A, B, C convey materials, components, products, and the like in the production site 24. At 20:45 or later in FIG. 31, the forklift A and the forklift B are concentrated in an assembly line 3 and a product warehouse, and thus it is found that there is a large amount of materials and the situation is tight. Therefore, the abnormality detection unit 17 detects the concentration of the positions of the plurality of workers as abnormality. It is noted that the situation in which a plurality of workers are concentrated at the same position within a predetermined time period is taken as abnormality.

Figure 32:
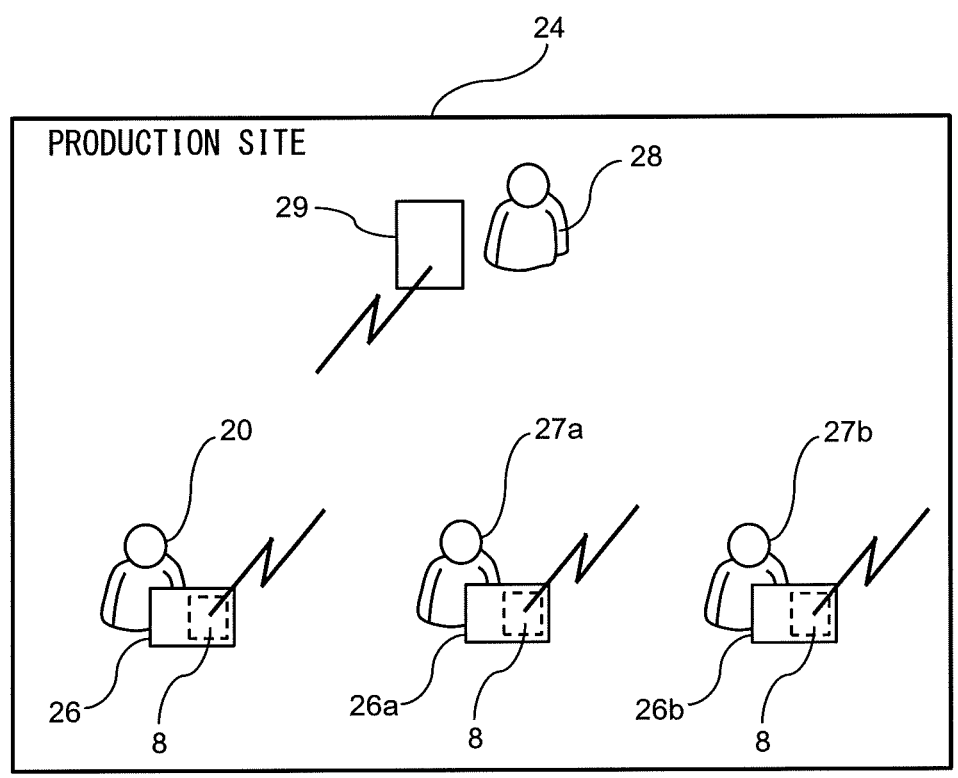
FIG. 32 shows an example of addressing the case where abnormality is detected, according to embodiment 3.
Figure 33:
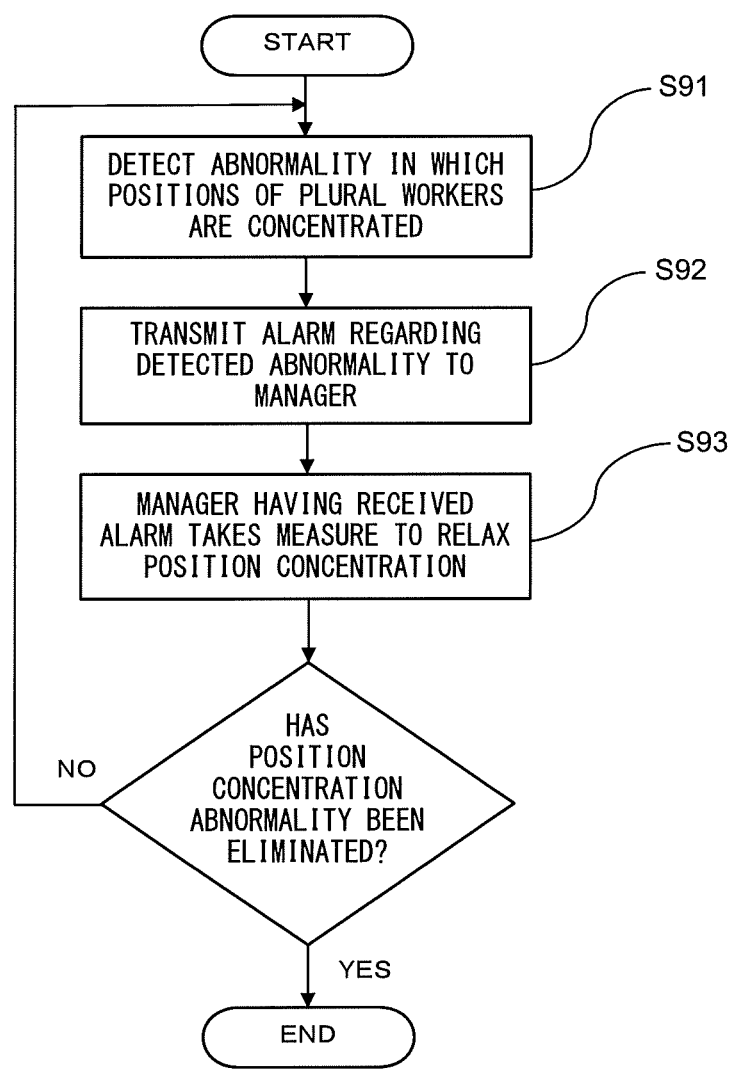
FIG. 33 is a flowchart in the case where abnormality is detected, according to embodiment 3.

FIG. 32 shows an example of addressing the case where abnormality is detected, and FIG. 33 is a flowchart in the case where abnormality is detected. When abnormality is detected (step S91 in FIG. 33), an alarm indicating the detected abnormality in which the positions of a plurality of workers are concentrated is transmitted from the abnormality detection unit 17 via the communication module 8 to a management terminal 29 used by a manager 28 in the production site 24 (step S92 in FIG. 33). By transmission of the alarm, the manager 28 is prompted to address the concentration of the positions of the plurality of workers in the production site 24. The manager 28 who has received the alarm takes a measure such as calling for another forklift for help or indicating disposition of the forklifts in consideration of material amount balance for sections other than the assembly line 3, thereby relaxing the position concentration (step S93 in FIG. 33). These steps are repeated until the position concentration is relaxed. In addition, the detected position concentration of the plurality of workers is displayed on the display 10 of each of the activity recording devices 26, 26a, 26b, so as to prompt the plurality of workers whose positions are concentrated, to relax the position concentration. In FIG. 32, the manager 28 is present in the production site 24. However, without limitation thereto, the manager 28 may be present outside the production site 24.

As described above, in the activity recording device 26 according to embodiment 3, since the abnormality detection unit 17 is provided, activity data of a plurality of workers can be merged and compared with each other. Through the comparison, abnormality in which the positions of the plurality of workers are concentrated can be detected. Owing to the detection of abnormality in which the positions of the plurality of workers are concentrated, it is possible to address the abnormal situation in which the positions of the plurality of workers are concentrated, in the production site, so as to contribute to appropriate personnel distribution.

Embodiment 4

Figure 34:
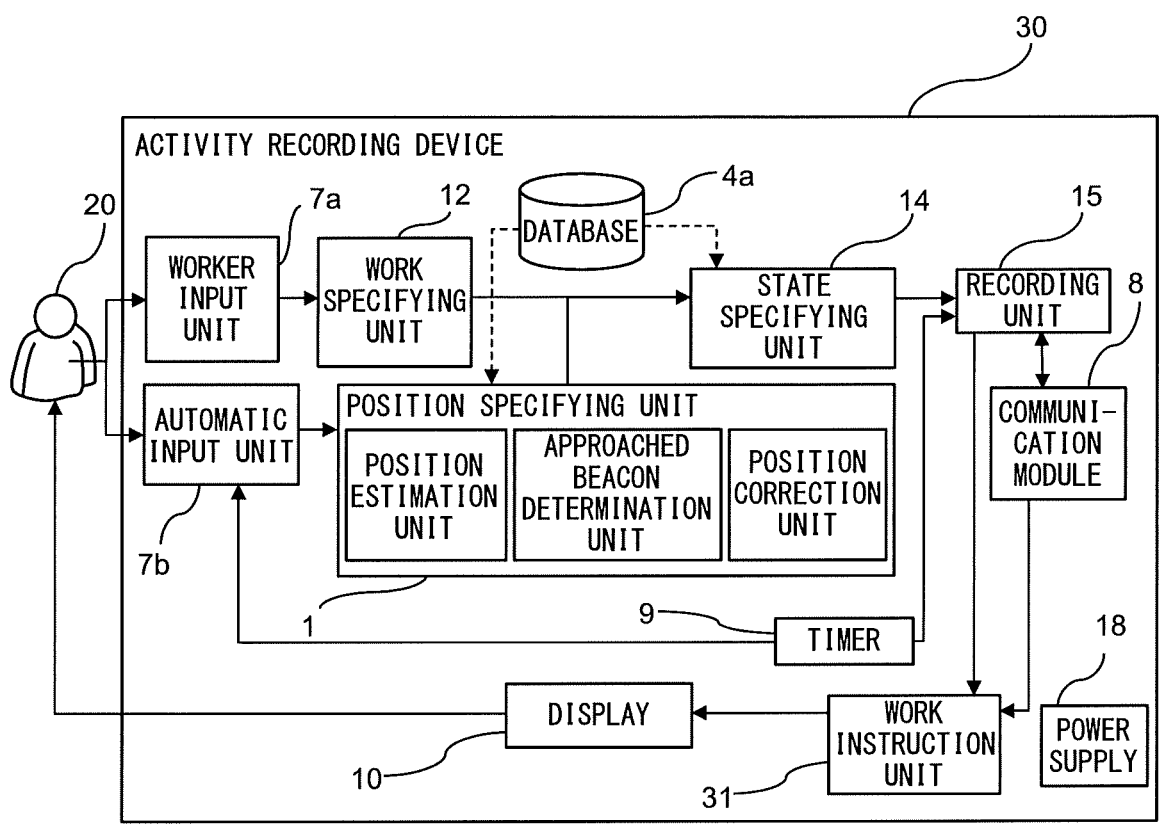
FIG. 34 is a functional configuration diagram of an activity recording device according to embodiment 4.
Figure 35:
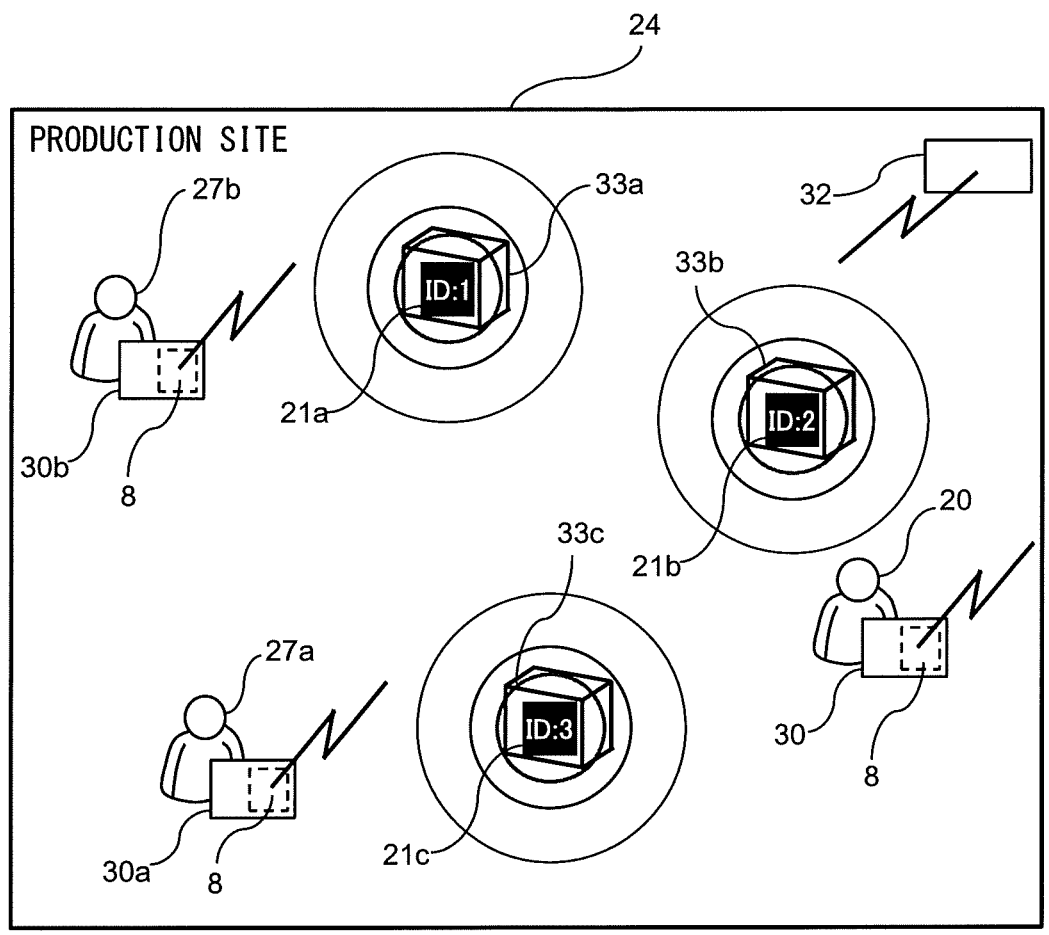
FIG. 35 shows an example in which a plurality of workers are doing activities in a production site in which a plurality of production devices are provided, according to embodiment 4.

An activity recording device 30 according to embodiment 4 will be described. FIG. 34 is a functional configuration diagram of the activity recording device 30 according to embodiment 4, and FIG. 35 shows an example in which a plurality of workers 20, 27a, 27b are doing activities in the production site 24 in which a plurality of production devices 33a, 33b, 33c are provided. In embodiment 1, a production device in which abnormality has occurred is not restored. In contrast, in embodiment 4, the activity recording device 30 is provided with a work instruction unit 31, and instructs, via the work instruction unit 31, the worker 20 close to the production device 33b in which abnormality has occurred, to restore the production device 33b in which abnormality has occurred. The other components are the same as those in embodiment 1, and therefore they are denoted by the same reference characters and description thereof is omitted.

As shown in FIG. 35, the workers 20, 27a, 27b are working in the production site 24, and the respective workers carry the activity recording devices 30, 30a, 30b with them. The activity recording devices are denoted by different reference characters so as to correspond to the respective different workers. However, the activity recording devices 30a, 30b are the same devices as the activity recording device 30. In the production site 24, the production devices 33a, 33b, 33c are placed, and the beacons 21a, 21b, 21c are provided to the respective production devices. In the production site 24, a work instruction system 32 is provided outside the activity recording devices 30, 30a, 30b. The activity recording devices 30, 30a, 30b can determine which production device is approached by each worker, through the approached beacon determination shown in FIG. 17, and record a result of the determination. In addition, the activity recording devices 30, 30a, 30b transmit activity data including the positions of the workers that are determined, via the communication module 8, to the work instruction system 32.

On the other hand, when abnormality occurs in any of the production devices 33a, 33b, 33c so that the production is stopped, an abnormal status such as a flag indicating the abnormality occurring in the production device 33a, 33b, 33c is transmitted to the work instruction system 32 by a communication device or the like. In the case where no abnormality occurs, the production devices 33a, 33b, 33c each transmit a normal status to the work instruction system 32. It is noted that the transmission to the work instruction system 32 may be performed wirelessly or via a wire.

Figure 36:
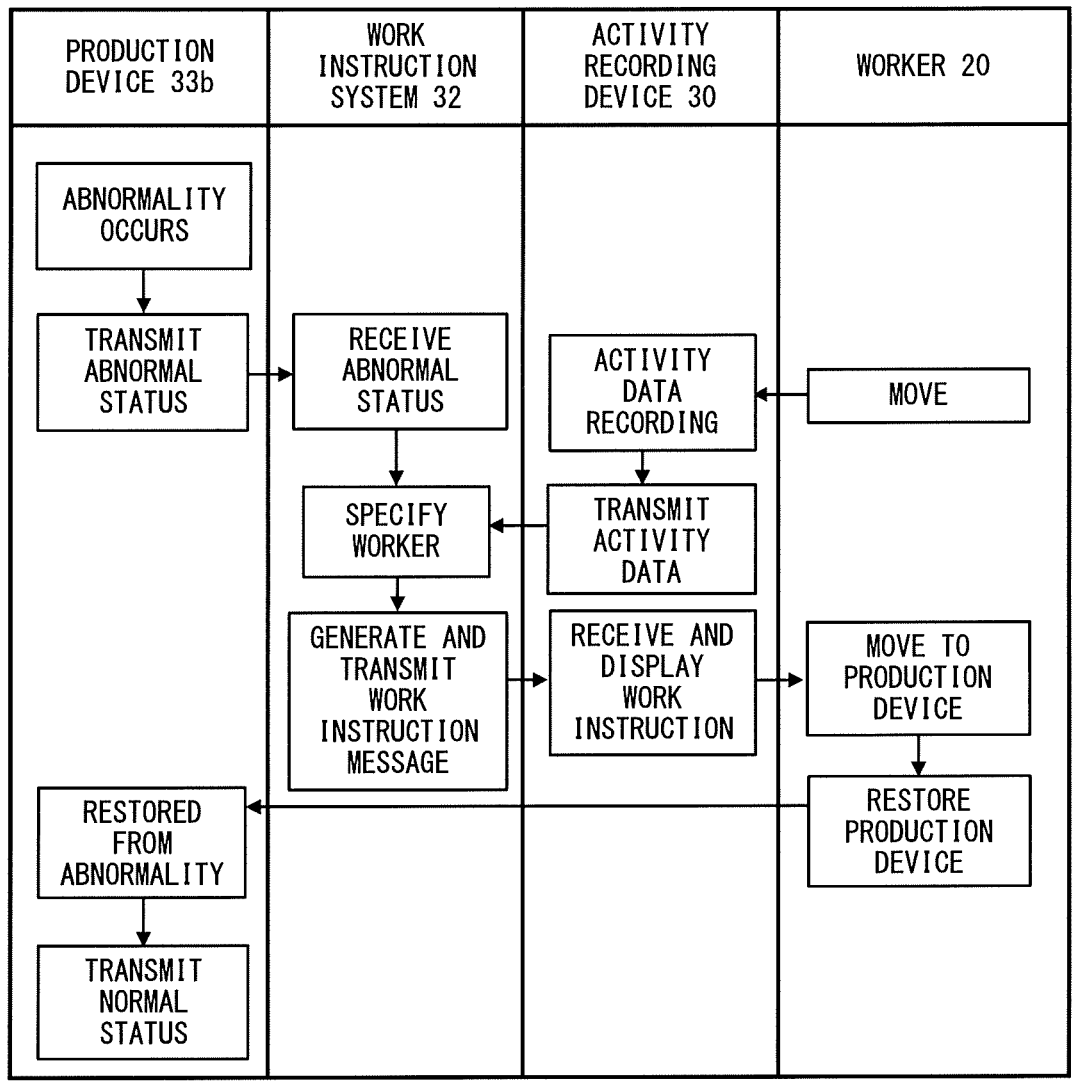
FIG. 36 shows a restoration scenario for a production device in which abnormality has occurred, according to embodiment 4.

Restoration of the production device 33b in which abnormality has occurred will be described. FIG. 36 shows a restoration scenario for the production device 33b in which abnormality has occurred, and how the production device 33b, the work instruction system 32, the activity recording device 30, and the worker 20 shown in the row direction operate is shown in a column direction as a flowchart. The work instruction system 32 receives a normal status or an abnormal status from the production devices 33a, 33b, 33c, and receives activity data from the workers 20, 27a, 27b. When the work instruction system 32 has received an abnormal status from the production device 33b, the work instruction system 32 specifies the worker 20 that is close to the production device 33b in which abnormality has occurred, by using the activity data transmitted from the workers. Next, on the basis of the activity data and the abnormal status, the work instruction system 32 generates a work instruction message for restoring the production device 33b in which abnormality has occurred, and transmits the work instruction message to the activity recording device 30 that the specified worker 20 has. As shown in FIG. 34, the work instruction unit 31 of the activity recording device 30 receives the work instruction message via the communication module 8, and displays the work instruction message on the display 10 which is the display screen of the activity recording device 30. The worker 20 having the activity recording device 30 moves to the production device 33b in which abnormality has occurred, in accordance with the work instruction message displayed on the display 10, and restores the production device 33b. The production device 33b restored from abnormality transmits a normal status to the work instruction system 32. In FIG. 35, the work instruction system 32 is provided in the production site 24. However, without limitation thereto, the work instruction system 32 may be provided outside the production site 24.

As described above, in the activity recording device 30 according to embodiment 4, the work instruction unit 31 is provided so that a work instruction message from the work instruction system 32 can be received via the communication module 8. Therefore, when abnormality has occurred in any of the production devices 33a, 33b, 33c, a restoration instruction can be issued to a worker closest to the production device in which abnormality has occurred, whereby the production device in which abnormality has occurred can be swiftly restored at the production site 24.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 central processing unit (CPU)
2 program memory
3 work memory
4 main memory (including database of various data and storage in which activity data is stored)
4a database
5 data bus
6 interface
7 input unit
7a worker input unit
7b automatic input unit
7c acceleration sensor
7d azimuth sensor
7e beacon radio wave strength sensor
8 communication module
9 timer
10 display
11 activity recording device
12 work specifying unit
13 position specifying unit
14 state specifying unit
15 recording unit
16 comparison detection unit
17 abnormality detection unit
18 power supply
20 worker
21 beacon
22 radio wave transmission module
23 beacon power supply
24 production site
25 activity recording device
26 activity recording device
27 worker
28 manager
29 management terminal
30 activity recording device 31 work instruction unit
32 work instruction system
33a, 33b, 33c production device

The invention claimed is:

1. An activity recording device comprising:
a work specifying processor for specifying a work of a worker;
a position specifying processor for specifying a position of the worker from a position coordinate of the worker;
a state specifying processor for specifying a state of the work of the worker from the position specified by the position specifying processor;
an input device including (i) an acceleration sensor, (ii) an azimuth sensor, and (iii) a beacon radio wave strength sensor configured to detect beacon radio waves;
a storage in a main memory configured to store, as activity data, the work, the position, and the state in association with an activity time; and
a transceiver configured to transmit and receive contents of the activity data to and from an external device,
wherein the position specifying processor is configured to (i) receive an acceleration signal from the acceleration sensor, an azimuth from the azimuth sensor, and a beacon radio wave strength from the beacon radio wave strength sensor, and (ii) calculate a movement speed of the worker on a basis of the acceleration signal received from the acceleration sensor,
wherein the position specifying processor includes:
a position estimation processor configured to estimate the position of the worker on a basis of the calculated movement speed of the worker and a history of a direction of the worker indicated by the azimuth received from the azimuth sensor, and
a position correction processor configured to (i) extract a period in which a reception strength, at which the beacon radio wave strength sensor receives beacon radio waves emitted from a plurality of beacons used in a predetermined space in which the worker is present, is smaller than a predetermined strength, and (ii) and correct the position of the worker in the period in accordance with a difference in the position estimated by the position estimation processor and a difference between coordinate positions of the beacons before and after the period, and
wherein the transceiver transmits the recorded activity data to another activity recording device, and receives another activity data transmitted from the other activity recording device.

2. The activity recording device according to claim 1, wherein
the work, the position, and the state are specified by being selected from predetermined items in relevance data stored in a database.

3. The activity recording device according to claim 1, wherein
standard activity data indicating standard patterned activity for the work is stored in a database in advance, and
the activity recording device is configured to compare the standard activity data and the recorded activity data and detect a non-standard work different from the standard activity data.

4. The activity recording device according to claim 2, wherein
standard activity data indicating standard patterned activity for the work is stored in a database in advance, and
the activity recording device is configured to compare the standard activity data and the recorded activity data and detect a non-standard work different from the standard activity data.

5. The activity recording device according to claim 1, further comprising an abnormality detector for comparing the activity data and the other activity data and detecting concentration of positions of a plurality of the workers.

6. The activity recording device according to claim 2, further comprising an abnormality detector for comparing the activity data and the other activity data and detecting concentration of positions of a plurality of the workers.

7. A non-transitory computer-readable storage medium that stores an activity recording program for an activity recording device to execute:
a work specifying step of specifying a work of a worker;
a position specifying step of specifying a position of the worker from a position coordinate of the worker;
a state specifying step of specifying a state of the work of the worker from the position specified in the position specifying step;
a beacon radio wave detection step of detecting, by a beacon radio wave strength sensor, beacon radio waves emitted from beacons;
a storing step of storing, in a storage in a main memory, as activity data, the work, the position, and the state in association with an activity time; and
a communication step of performing transmission/reception to/from another activity recording device, wherein
the position specifying step includes:
receiving an acceleration signal from an acceleration sensor of the activity recording device, an azimuth from an azimuth sensor of the activity recording device, and a beacon radio wave strength from the beacon radio wave strength sensor of the activity recording device,
calculating a movement speed of the worker on a basis of the acceleration signal received from the acceleration sensor,
a position estimation step of estimating the position of the worker on a basis of the movement speed of the worker and a history of a direction of the worker indicated by the azimuth received from the azimuth sensor, and
a position correction step of (i) extracting a period in which a reception strength, at which the beacon radio wave strength sensor receives beacon radio waves emitted from a plurality of beacons used in a predetermined space in which the worker is present, is smaller than a predetermined strength, and (ii) correcting the position of the worker in the period in accordance with a difference in the position estimated in the position estimation step and a difference between coordinate positions of the beacons before and after the period, and
the communication step includes:
a transmission step of transmitting the recorded activity data to the other activity recording device, and
a reception step of receiving another activity data transmitted from the other activity recording device.

8. A non-transitory computer-readable storage medium that stores the activity recording program according to claim 7, further comprising an abnormality detection step of comparing the activity data and the other activity data and detecting concentration of positions of a plurality of the workers.

9. An activity recording method for an activity recording device, the method comprising:

specifying, by a work specifying processor, a work of a worker;

receiving, by a position specifying processor, an acceleration signal from an acceleration sensor of the activity recording device;

receiving, by the position specifying processor, an azimuth from an azimuth sensor of the activity recording device;

receiving, by the position specifying processor, a beacon radio wave strength from a beacon radio wave strength sensor of the activity recording device;

specifying, by a position specifying processor, a position of the worker from a position coordinate of the worker;

specifying, by a state specifying processor, a state of the work of the worker from the specified position;

storing, in a storage in a main memory, as activity data, the work, the position, and the state in association with an activity time; and performing transmission/reception to/from another activity recording device, wherein the position of the worker is specified by:

calculating a movement speed of the worker on a basis of the acceleration signal received from the acceleration sensor, estimating the position of the worker on a basis of the movement speed of the worker and a history of a direction of the worker indicated by the azimuth received from the azimuth sensor, extracting a period in which a reception strength, at which the beacon radio wave strength sensor receives beacon radio waves emitted from a plurality of beacons used in a predetermined space in which the worker is present, is smaller than a predetermined strength, and correcting the position of the worker in the period in accordance with a difference in the estimated position and a difference between coordinate positions of the beacons before and after the period, and the recorded activity data is transmitted to another activity recording device, and another activity data transmitted from the other activity recording device is received.

10. The activity recording method according to claim 9, further comprising:

comparing the activity data and the other activity data; and detecting concentration of positions of a plurality of the workers.

* * * * *